US011399147B2

(12) United States Patent
    Koizumi

(10) Patent No.: US 11,399,147 B2
(45) Date of Patent: Jul. 26, 2022

(54) IMAGING APPARATUS, AND IMAGING APPARATUS CONTROL METHOD

(71) Applicant: Sony Semiconductor Solutions Corporation, Kanagawa (JP)

(72) Inventor: Makoto Koizumi, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 16/635,631

(22) PCT Filed: May 11, 2018

(86) PCT No.: PCT/JP2018/018329
§ 371 (c)(1),
(2) Date: Jan. 31, 2020

(87) PCT Pub. No.: WO2019/039003
PCT Pub. Date: Feb. 28, 2019

(65) Prior Publication Data
US 2021/0136301 A1    May 6, 2021

(30) Foreign Application Priority Data

Aug. 21, 2017  (JP) .............................. JP2017-158853

(51) Int. Cl.
    *H04N 5/369*    (2011.01)
    *G06F 1/3212*   (2019.01)
(52) U.S. Cl.
    CPC ......... *H04N 5/3698* (2013.01); *G06F 1/3212* (2013.01)
(58) Field of Classification Search
    CPC ............... G06K 9/00664; H04N 5/335; H04N 5/23222; H04N 5/23245; H04N 5/3698
    (Continued)

(56) References Cited

U.S. PATENT DOCUMENTS

2004/0257456 A1  12/2004  Goris et al.
2005/0068435 A1*  3/2005  Shigemori ........... H04N 9/0451
                                                         348/272
(Continued)

FOREIGN PATENT DOCUMENTS

CN    1492710 A    4/2004
CN  101183275 A    5/2008
(Continued)

OTHER PUBLICATIONS

Chinese Office Action dated Nov. 26, 2021 for corresponding Chinese Application No. 201880060022.5.

*Primary Examiner* — Xi Wang
(74) *Attorney, Agent, or Firm* — Michael Best & Friedrich LLP

(57) ABSTRACT

To extend drive time in an imaging apparatus driven by a battery.

The imaging apparatus includes a remaining battery level detection unit, a solid-state imaging element, and a control unit. In the imaging apparatus, the remaining battery level detection unit detects a remaining battery level of the battery. Furthermore, in the imaging apparatus, the solid-state imaging element captures image data. Moreover, in the imaging apparatus, the control unit controls the solid-state imaging element to capture image data so that the lower the remaining battery level measured by a remaining battery level measurement unit, the smaller the data amount of the image data to be captured in synchronization with a predetermined synchronization signal.

14 Claims, 22 Drawing Sheets

(58) Field of Classification Search
USPC .......................................... 348/272, 294–324
See application file for complete search history.

(56) References Cited

U.S. PATENT DOCUMENTS

| | | | |
|---|---|---|---|
| 2008/0239093 A1* | 10/2008 | Easwar | G06T 9/007 348/222.1 |
| 2010/0061625 A1* | 3/2010 | Lukac | H04N 9/04515 382/162 |
| 2011/0212751 A1 | 9/2011 | Havens et al. | |
| 2013/0321652 A1 | 12/2013 | Hirose et al. | |
| 2016/0295113 A1* | 10/2016 | Iqbal | H04N 5/232941 |
| 2017/0088072 A1* | 3/2017 | Curtis | G08B 31/00 |
| 2017/0094171 A1* | 3/2017 | Lim | H04N 5/23229 |

FOREIGN PATENT DOCUMENTS

| | | |
|---|---|---|
| CN | 101232577 A | 7/2008 |
| CN | 102396234 A | 3/2012 |
| CN | 104410785 A | 3/2015 |
| CN | 106027857 A | 10/2016 |
| JP | 2002055730 A | 2/2002 |
| JP | 2003153093 A | 5/2003 |
| JP | 2004282345 A | 10/2004 |
| JP | 2005-229363 A | 8/2005 |
| JP | 2007104564 A | 4/2007 |

* cited by examiner

FIG. 3

| REMAINING BATTERY LEVEL | IMAGING CONTROL SIGNAL | | |
|---|---|---|---|
| | READOUT IMAGE SIZE | FRAME RATE | BIT DEPTH |
| 80% OR MORE | 3 MILLION PIXELS | 60fps | 12 BITS |
| LESS THAN 80%, AND 60% OR MORE | 2 MILLION PIXELS | 30fps | 11 BITS |
| LESS THAN 60%, AND 40% OR MORE | 1 MILLION PIXELS | 15fps | 10 BITS |
| ⋮ | ⋮ | ⋮ | ⋮ | a b c a b c a b c

IMAGING APPARATUS, AND IMAGING APPARATUS CONTROL METHOD

TECHNICAL FIELD

The present technology relates to an imaging apparatus and an imaging apparatus control method. Specifically, the present technology relates to an imaging apparatus driven by a battery and a method for controlling the imaging apparatus.

BACKGROUND ART

In recent years, the Internet of Things (IoT) technology that controls various things by connecting them to the Internet has attracted attention. Many of the devices used in the IoT system are driven by a battery, and thus is required to extend the drive time on the battery. Therefore, in order to extend the drive time, there is proposed an imaging apparatus, for example, that reduces the number of images to be encoded out of a plurality of pieces of image data in a captured moving image when the remaining battery level is low (for example, refer to Patent Document 1). Although reduction in the number of encoded images decreases the frame rate of the encoded moving image, the processing volume of the encoding processing can be reduced and the power consumption can be reduced.

CITATION LIST

Patent Document

Patent Document 1: Japanese Patent Application Laid-Open No. 2005-229363

SUMMARY OF THE INVENTION

Problems to be Solved by the Invention

In the above-described conventional art, reduction in the processing volume of the encoding processing can reduce the power consumption, and thus, the drive time can be extended. However, when the amount of individual image data is large, this causes a problem that the power consumption cannot be sufficiently reduced even with the reduced number of encoded images, causing an insufficient length of drive time by the battery.

The present technology has been developed in view of such a situation, and aims to extend the drive time in an imaging apparatus driven by a battery.

Solutions to Problems

The present technology has been made to solve the above-described problems. A first aspect of the present technology is an imaging apparatus and an imaging apparatus control method, the imaging apparatus including: a remaining battery level detection unit that detects a remaining battery level of a battery; a solid-state imaging element that captures image data; and a control unit that controls the solid-state imaging element so that the lower the remaining battery level, the smaller the data amount of the image data to be captured in synchronization with a predetermined synchronization signal. This brings about an effect that the lower the remaining battery level, the smaller the data amount of the image data to be captured.

Furthermore, in the first aspect, the control unit may control imaging so that the lower the remaining battery level, the lower the resolution of the image data. This brings about an effect that the lower the remaining battery level, the lower the resolution of the image data to be captured.

Furthermore, in the first aspect, the solid-state imaging element may include: a pixel array unit including a plurality of pixels arranged in a two-dimensional lattice shape; and a driver that sequentially selects and drives a plurality of lines including a predetermined number of pixels each arranged in a predetermined direction in the pixel array unit, and the control unit may control the driver so that the lower the remaining battery level, the smaller the number of lines to be selected. This brings about an effect that the lower the remaining battery level, the more the lines to be thinned out.

Furthermore, in the first aspect, the solid-state imaging element may include: a pixel array unit having a plurality of pixels arranged in a two-dimensional lattice shape; an analog-to-digital conversion unit that converts an analog signal output from the pixel array unit into a digital signal for each of pixels and outputs the signal as pixel data; and a pixel addition unit that adds the pixel data of a predetermined number, and the control unit may control the pixel addition unit so that the lower the remaining battery level, the larger the units of addition to be used to add the pixel data. This brings about an effect that the lower the remaining battery level, the larger the units of addition to be used to add the pixel data.

Furthermore, in the first aspect, the solid-state imaging element may include: a pixel array unit having a plurality of pixels arranged in a two-dimensional lattice shape; and an analog-to-digital conversion unit that converts an analog signal output from the pixel array unit into a digital signal for each of pixels and outputs the signal as pixel data, and the control unit may control the analog-to-digital conversion unit so that the lower the remaining battery level, the lower the bit depth of the pixel data to be output. This brings about an effect that the lower the remaining battery level, the lower the bit depth of image data to be output.

Furthermore, in the first aspect, the control unit may control so that the lower the remaining battery level, the lower the frequency of the predetermined synchronization signal to be used to capture the image data in synchronization with the synchronization signal. This brings about an effect that the lower the remaining battery level, the lower the frame rate to be used to capture the image data.

Furthermore, in the first aspect, the control unit may control the data amount on the basis of a comparison result obtained by comparing a predetermined threshold with the remaining battery level. This brings about an effect that it is possible to capture the image data of the data amount controlled on the basis of the comparison result of a threshold and a remaining battery level.

Furthermore, in the first aspect, the solid-state imaging element may include: a pixel array unit in which a plurality of pixels is arranged; and a drive voltage supply unit that supplies a drive voltage to the pixel array unit, and the control unit may control the drive voltage supply unit so that the lower the remaining battery level, the lower the drive voltage to be supplied. This brings about an effect that that the lower the remaining battery level, the lower the drive voltage supplied to the pixel array unit.

Furthermore, in the first aspect, the control unit may supply the drive voltage having a logarithmic value of the remaining battery level. This brings about an effect that the drive voltage is logarithmically controlled.

Furthermore, in the first aspect, it is allowable to further include an image processing unit that executes a plurality of types of image processing on the image data, and the control unit may control the image processing unit so that the lower the remaining battery level, the smaller the processing volume of the image processing to be executed. This brings about an effect that the lower the remaining battery level, the smaller the processing volume of image processing performed on the image data.

Furthermore, in the first aspect, the image processing unit may include: a separation unit that separates the image data into a luminance signal and a color difference signal; a luminance signal processing unit that processes the luminance signal; and a color signal processing unit that processes the color difference signal, and the control unit may stop either the luminance signal processing unit or the color signal processing unit in a case where the remaining battery level is lower than a predetermined threshold. This brings about an effect that only one of the luminance signal processing unit and the color signal processing unit is executed in a case where the remaining battery level is lower than a predetermined threshold.

Furthermore, in the first aspect, it is allowable to further include a compression unit that compresses the image data, and the control unit may control the compression unit so that the lower the remaining battery level, the higher the compression rate to be used to compress the image data. This brings about an effect that the lower the remaining battery level, the higher the compression rate to be used to output an image.

Furthermore, in the first aspect, it is allowable to further include a region-of-interest setting unit that sets a specific region in the image data as a region-of-interest, and the compression unit may set a compression rate of the predetermined region-of-interest to be lower than in a region not corresponding to the predetermined region-of-interest, and the control unit may control the region-of-interest setting unit so that the lower the remaining battery level, the smaller the area of the predetermined region-of-interest to be set. This brings about an effect that the lower the remaining battery level, the smaller the area of a region-of-interest set in an image to be compressed.

Effects of the Invention

According to the present technology, it is possible to achieve an excellent effect that the drive time can be extended in an imaging apparatus driven by a battery. Note that effects described herein are necessarily non-restricting. The effects may be any of effects described in the present disclosure.

BRIEF DESCRIPTION OF DRAWINGS

FIG. 3 is a diagram illustrating a setting example of an imaging control signal according to a remaining battery level in the first embodiment of the present technology.

MODE FOR CARRYING OUT THE INVENTION

Hereinafter, modes for carrying out the present technology (hereinafter, referred to as embodiment(s)) will be described. The description will be given in the following order.

1. First Embodiment (example of controlling data amount in accordance with remaining battery level)

2. Second embodiment (example of controlling data amount and processing volume in accordance with remaining battery level)

3. Third embodiment (example of controlling data amount, processing volume, and compression rate in accordance with remaining battery level)

4. Modification

1. First Embodiment

[Exemplary Configuration of Communication System]

Figure 1:
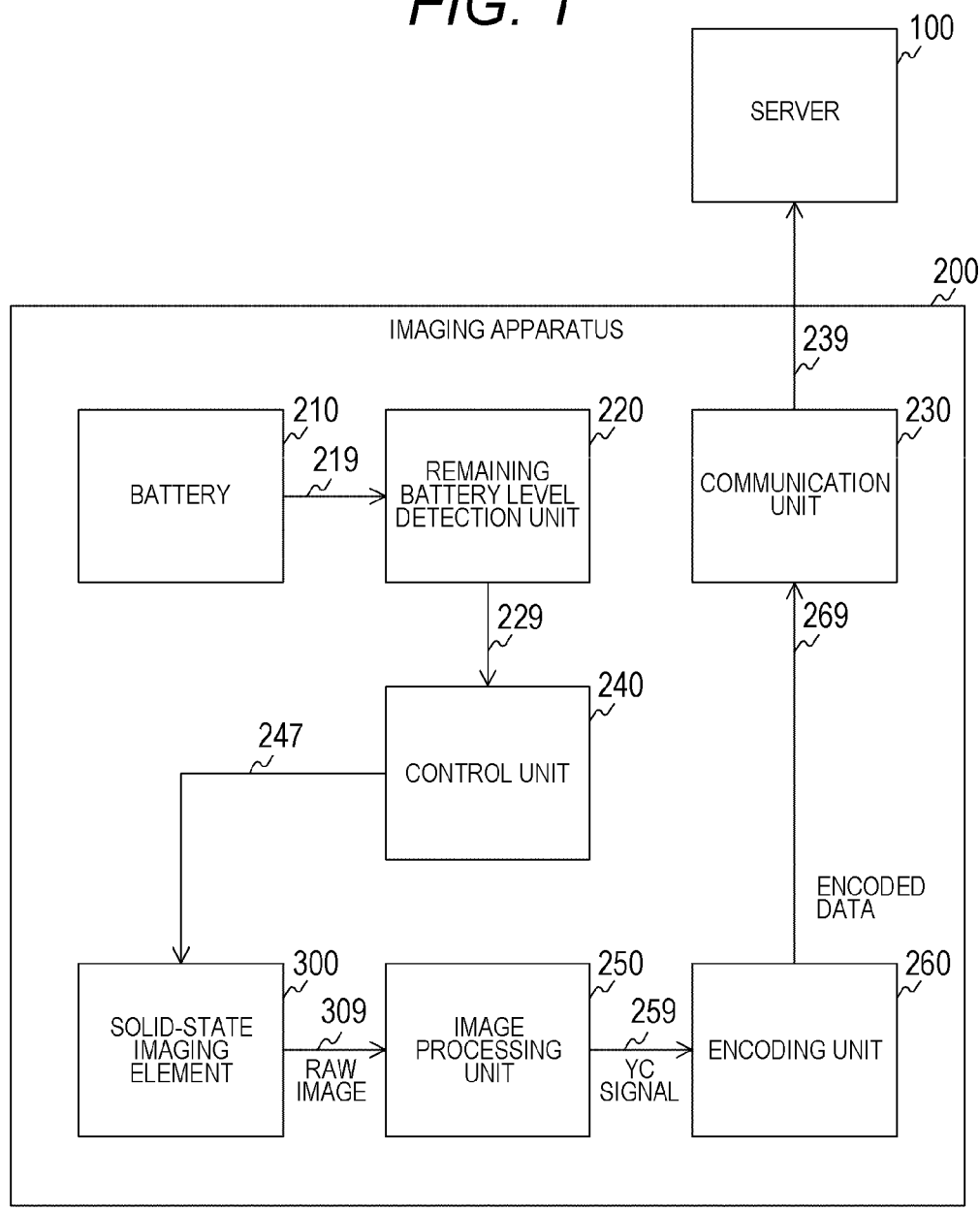
FIG. 1 is a block diagram illustrating a configuration example of a communication system according to a first embodiment of the present technology.

FIG. 1 is a block diagram illustrating a configuration example of a communication system according to a first embodiment of the present technology. This communication system is a system used for remote monitoring or the like, and includes a server 100 and an imaging apparatus 200.

The imaging apparatus 200 is an apparatus that captures image data, and includes a battery 210, a remaining battery level detection unit 220, a communication unit 230, a control unit 240, a solid-state imaging element 300, an image processing unit 250, and an encoding unit 260. Examples assumed as the imaging apparatus 200 include a digital camera such as an IoT camera or an information processing device (such as a personal computer or a smartphone) having an imaging function. Furthermore, the imaging apparatus 200 is installed in a remote place physically separated from the server 100, for example.

The battery 210 discharges and thereby supplies power to the circuits in the imaging apparatus 200. As the battery 210 to be used is either a primary battery capable of performing only discharging or a secondary battery capable of storing electric power by charging, in addition to performing discharging.

The remaining battery level detection unit 220 detects the remaining battery level of the battery 210. The remaining battery level detection unit 220 detects the remaining battery level using a voltage measurement method of measuring a terminal voltage, a Coulomb counter method using an integrated value of charge/discharge time, or the like. Furthermore, the detection of the remaining battery level is performed periodically, for example. The remaining battery level detection unit 220 generates remaining battery level data indicating a detected value of the remaining battery level, and supplies the remaining battery level data to the control unit 240 via a signal line 229.

The control unit 240 performs overall control of the imaging apparatus 200. The control unit 240 generates an imaging control signal for controlling the operation of the solid-state imaging element 300 on the basis of the remaining battery level data, and supplies the imaging control signal via a signal line 247. The imaging control signal includes setting information related to the data amount of image data, and setting information for each of the frame rate and the drive voltage. The setting information related to the data amount includes, for example, a setting value of at least one of the readout image size or the bit depth.

Here, the readout image size indicates the number of pixels (that is, resolution) of image data read out from the solid-state imaging element 300. The frame rate indicates the number of pieces of image data captured by the solid-state imaging element 300 within a unit time. The same value as the frame rate is set as the frequency of a vertical synchronization signal VSYNC that operates the solid-state imaging element 300. Furthermore, the bit depth indicates the number of bits per pixel in the image data read out from the solid-state imaging element 300. The drive voltage indicates a power supply voltage supplied to the solid-state imaging element 300.

The control unit 240 uses the imaging control signal to control the solid-state imaging element 300 to output image data so that the lower the remaining battery level, the smaller the data amount of the image data to be output in synchronization with the vertical synchronization signal VSYNC. Furthermore, the control unit 240 controls so that the lower the remaining battery level, the lower the frequency (that is, frame rate) of the vertical synchronization signal VSYNC. Furthermore, the control unit 240 controls so that the lower the remaining battery level, the lower the drive voltage. Note that the control unit 240 controls all of the data amount, the frame rate, and the drive voltage of the image data in accordance with the remaining battery level, but can also control data amount alone. Furthermore, the control unit 240 can control the data amount of the image data alone and the drive voltage alone in accordance with the remaining battery level.

The solid-state imaging element 300 captures image data under the control of the control unit 240. The image data includes a plurality of pieces of pixel data arranged in a two-dimensional lattice shape. Each of pieces of pixel data includes, for example, any of pieces of color information of Red (R), Green (G), and Blue (B). Furthermore, the pixel data is arranged in a Bayer array, for example. The solid-state imaging element 300 captures image data in synchronization with the vertical synchronization signal VSYNC, and outputs the image data as a RAW image to the image processing unit 250 via a signal line 309.

The image processing unit 250 performs predetermined image processing on a RAW image. This image processing includes, for example, YC separation processing for separating image data into luminance signals and color signals. The image processing unit 250 supplies the YC signal including the separated luminance signals and color signals to the encoding unit 260 via a signal line 259.

The encoding unit 260 encodes the YC signal. For example, encoding includes execution of YC signal compression or encryption. The encoding unit 260 supplies the encoded YC signal as encoded data to the communication unit 230 via a signal line 269.

The communication unit 230 transmits the encoded data to the server 100 in wireless or wired communication.

The server 100 receives and decodes encoded data. The server 100 displays the decoded image data on a display device (not illustrated) such as a monitor. A user of the communication system visually recognizes the displayed image data and thereby can grasp the state of a remote place where the imaging apparatus 200 is arranged.

Figure 2:
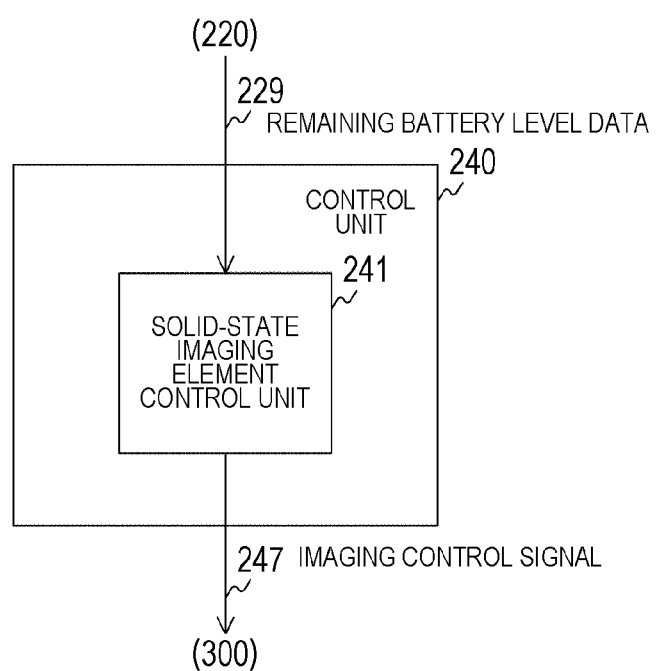
FIG. 2 is a block diagram illustrating a configuration example of a control unit according to the first embodiment of the present technology.

FIG. 2 is a block diagram illustrating a configuration example of the control unit 240 according to the first embodiment of the present technology. The control unit 240 includes a solid-state imaging element control unit 241. The solid-state imaging element control unit 241 uses the imaging control signal to control the solid-state imaging element 300 to output image data so that the lower the remaining battery level, the smaller the data amount of the image data to be output in synchronization with the vertical synchronization signal VSYNC. Furthermore, the solid-state imaging element control unit 241 controls so that the lower the remaining battery level, the lower the frame rate. Moreover, the solid-state imaging element control unit 241 controls so that the lower the remaining battery level, the lower the drive voltage.

FIG. 3 is a diagram illustrating a setting example of an imaging control signal according to a remaining battery level in the first embodiment of the present technology. This imaging control signal includes setting information for a readout image size, a frame rate, and a bit depth.

The control unit 240 sets a readout image size so that the lower the remaining battery level, the smaller the readout image size. Furthermore, the control unit 240 sets a frame rate so that the lower the remaining battery level, the lower the frame rate. Furthermore, the control unit 240 sets a bit depth so that the lower the remaining battery level, the lower the bit depth. These parameters are controlled in (N+1) stages on the basis of a comparison result between the remaining battery level and N (N is an integer) thresholds.

For example, in a case where the remaining battery level is 80% or more, a readout image size of "three million pixels" is set, a frame rate of "60" frames per second (fps) is set, and the bit depth of "12" bits is set. Furthermore, in a case where the remaining battery level is less than 80% and 60% or more, a readout image size of "two million pixels" is set, a frame rate of "30" fps is set, and a bit depth of "11" bits is set. Furthermore, in a case where the remaining battery level is less than 60% and 40% or more, a readout image size of "one million pixels" is set, a frame rate of "15" fps is set, and a bit depth of "10" bits is set.

Note that the readout image size may be set by using a combination of the number of vertical pixels and the number of horizontal pixels, such as "200×200". Furthermore, although the control unit 240 reduces all of the readout image size, frame rate, and bit depth when the remaining battery level drops below a threshold (80%, or the like), it is allowable to reduce only one or two of these. Furthermore, although the control unit 240 controls both the readout image size and the bit depth, the control unit 240 may control only one of them. Furthermore, the control unit 240 reduces the frame rate together with the decrease in the remaining battery level. However, it is also possible to have a configuration in which frame rates are not controlled in a case where the data rate can be sufficiently reduced by controlling the readout image size or bit depth.

[Configuration Example of Solid-State Imaging Element]

Figure 4:
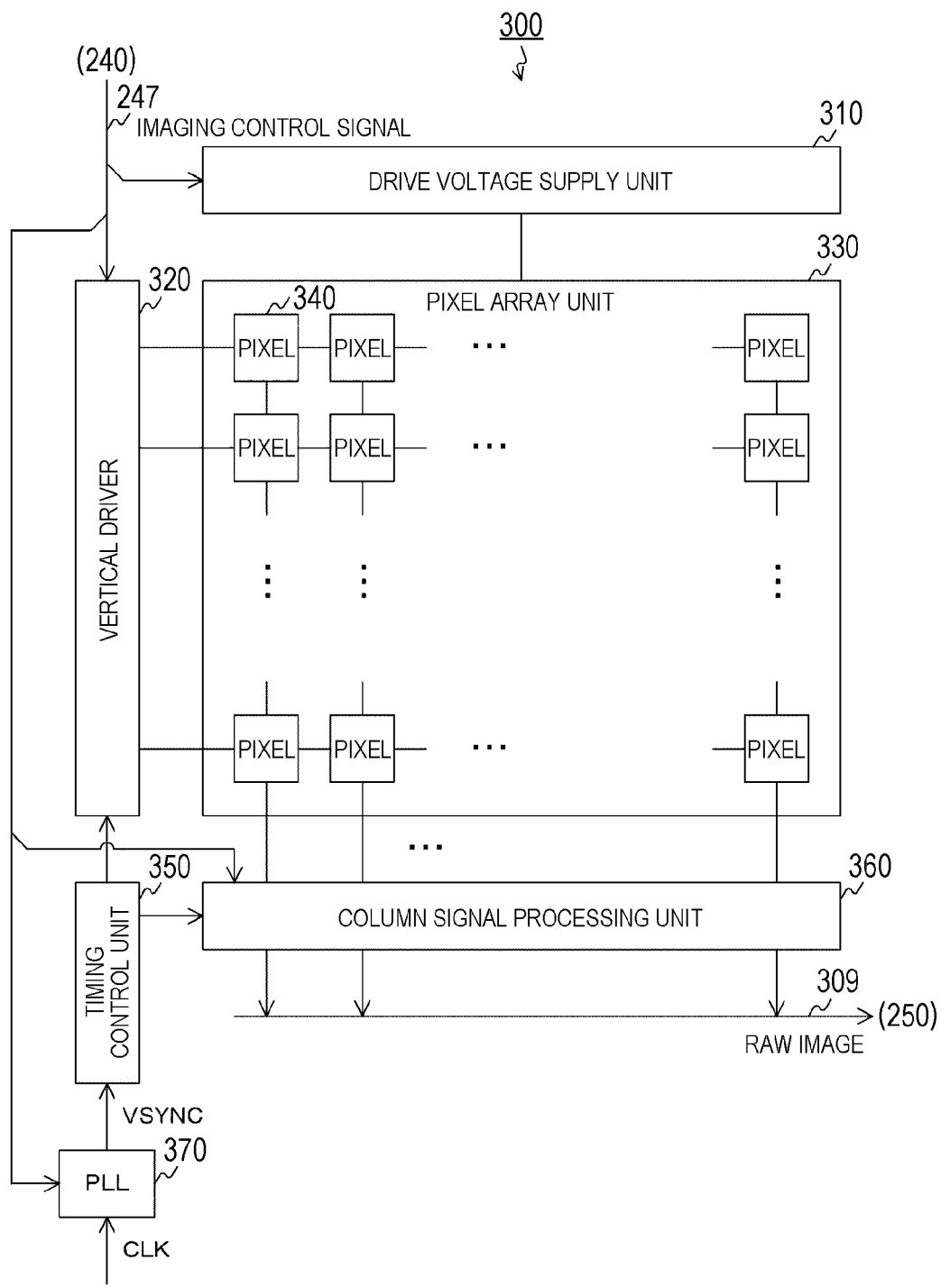
FIG. 4 is a block diagram illustrating a configuration example of a solid-state imaging element according to the first embodiment of the present technology.

FIG. 4 is a block diagram illustrating a configuration example of the solid-state imaging element 300 according to a first embodiment of the present technology. The solid-state imaging element 300 includes a drive voltage control unit 310, a vertical driver 320, a pixel array unit 330, a timing control unit 350, a column signal processing unit 360, and a Phase Locked Loop (PLL) 370. Furthermore, the pixel array unit 330 includes a plurality of pixels 340 arranged in a two-dimensional lattice shape.

A set of pixels 340 arranged in a predetermined direction (such as a horizontal direction) in the pixel array unit 330 will be hereinafter referred to as "row" or "line". Furthermore, a set of pixels 340 arranged in a direction perpendicular to the row in the pixel array unit 330 will be hereinafter referred to as a "column".

The drive voltage control unit 310 generates the drive voltage VDD, supplies it to the pixel array unit 330, and controls the drive voltage VDD in accordance with the imaging control signal.

The vertical driver 320 selects and drives lines in order. Each of the pixels 340 in the selected line outputs an analog pixel signal to the column signal processing unit 360. The vertical driver 320 is implemented by using a shift register, for example. Note that the vertical driver 320 is an example of a driver described in the claims.

The pixel 340 performs photoelectric conversion and outputs an analog pixel signal.

The timing control unit 350 controls operation timing of each of the vertical driver 320 and the column signal processing unit 360 in synchronization with the vertical synchronization signal VSYNC.

The column signal processing unit 360 performs predetermined signal processing such as Analog to Digital (AD) conversion processing on the pixel signal for each of columns. Furthermore, the column signal processing unit 360 performs pixel addition processing of adding a predetermined number pieces of pixel data in accordance with the imaging control signal. The column signal processing unit 360 supplies the processed data to the image processing unit 250.

The PLL 370 multiplies a clock signal CLK having a predetermined frequency and thereby generates a vertical synchronization signal VSYNC. For example, an oscillation signal from a crystal oscillator is input to the PLL 370 as a clock signal CLK.

The control unit 240 uses the imaging control signal to control the drive voltage control unit 310 so that the lower the remaining battery level, the lower the drive voltage VDD to be supplied.

Furthermore, the control unit 240 uses the imaging control signal to control the vertical driver 320 so that the lower the remaining battery level, the smaller the number of lines to be selected. This allows thinning readout to be performed in the vertical direction. Note that it is allowable to further provide the solid-state imaging element 300 with a horizontal driver for selecting a column, and allowable to control the horizontal driver to perform horizontal thinning, that is, control so that the lower the remaining battery level, the smaller the number of columns to be selected.

Furthermore, the control unit 240 uses the imaging control signal to control the column signal processing unit 360 so that the lower the remaining battery level, the larger the units of addition to be used for pixel addition. Furthermore, the control unit 240 controls the column signal processing unit 360 so that the lower the remaining battery level, the lower the bit depth of the pixel data to be output.

The control unit 240 can control the number of pixels (that is, resolution) of image data by thinning readout and pixel addition. Furthermore, the control unit 240 can control the data amount of the image data by controlling the resolution and the bit depth. Note that although the control unit 240 controls all of the thinning readout, pixel addition, and bit depth, the control unit 240 may control only one or only two of them.

Furthermore, the control unit 240 uses the imaging control signal to control the PLL 370 so that the lower the remaining battery level, the lower the frequency (that is, frame rate) to be used to generate the vertical synchronization signal VSYNC.

[Configuration Example of Pixel Circuit]

Figure 5:
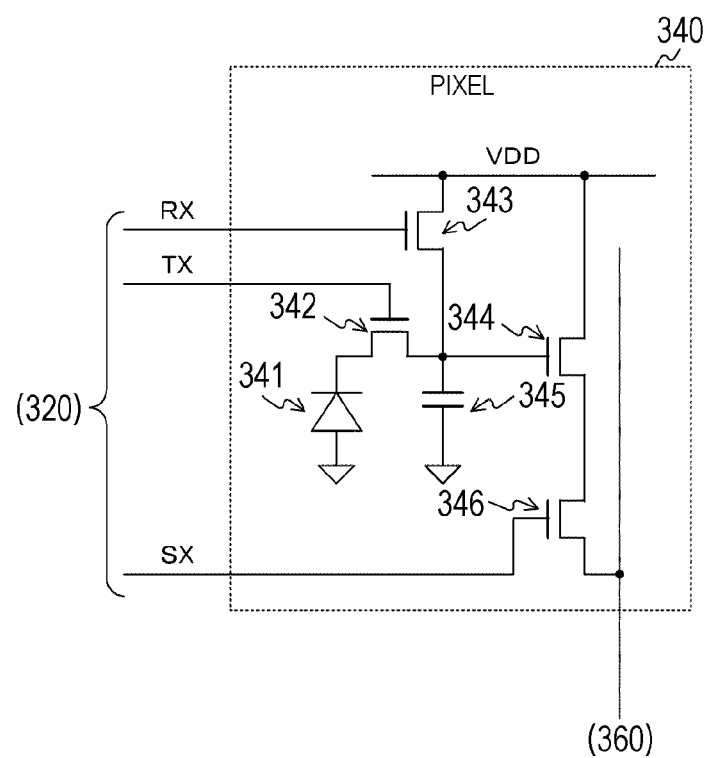
FIG. 5 is a circuit diagram illustrating a configuration example of a pixel according to the first embodiment of the present technology.

FIG. 5 is a circuit diagram illustrating a configuration example of the pixel 340 according to the first embodiment of the present technology. Each of the pixels 340 includes a photodiode 341, a readout transistor 342, a reset transistor 343, a drive transistor 344, a floating diffusion layer 345, and a selection transistor 346.

The photodiode 341 converts light into electric charge. The readout transistor 342 transfers a charge to the floating diffusion layer 345 in accordance with a transfer signal TX from the vertical driver 320. The reset transistor 343 extracts a charge from the floating diffusion layer 345 in accordance with a reset signal RX from the vertical driver 320, and initializes the charge amount. The floating diffusion layer 345 accumulates charges and generates a voltage corresponding to the charge amount. The drive transistor 344 amplifies the voltage of the floating diffusion layer 345 and outputs the voltage as an analog pixel signal. The selection transistor 346 outputs the pixel signal to the column signal processing unit 360 via a vertical signal line in accordance with a selection signal SX from the vertical driver 320.

When the drive voltage VDD of the pixel 340 is lowered, the reverse bias voltage applied to the photodiode 341 will be lowered, leading to the reduction in the thickness of the depletion layer. This results in a decrease in the sensitivity of the pixel 340, making the image data darker. Compensating for the darkened portion using amplification with digital gain by a subsequent circuit (such as the column signal processing unit 360) would increase noise. Furthermore, the fall of the reverse bias voltage applied to the photodiode 341 lowers the potential of the pixel 340 and reduces the number of saturated electrons, leading to the reduction in the number of electrons that can be accumulated in the pixel 340. This will decrease the gradation of the pixel signal. Compensating for the decrease in the gradation using amplification with digital gain by a subsequent circuit would increase noise in a similar manner. That is, lowering the drive voltage VDD would increase noise and degrade image quality. However, lowering the drive voltage VDD can reduce power consumption.

[Configuration Example of Column Signal Processing Unit]

Figure 6:
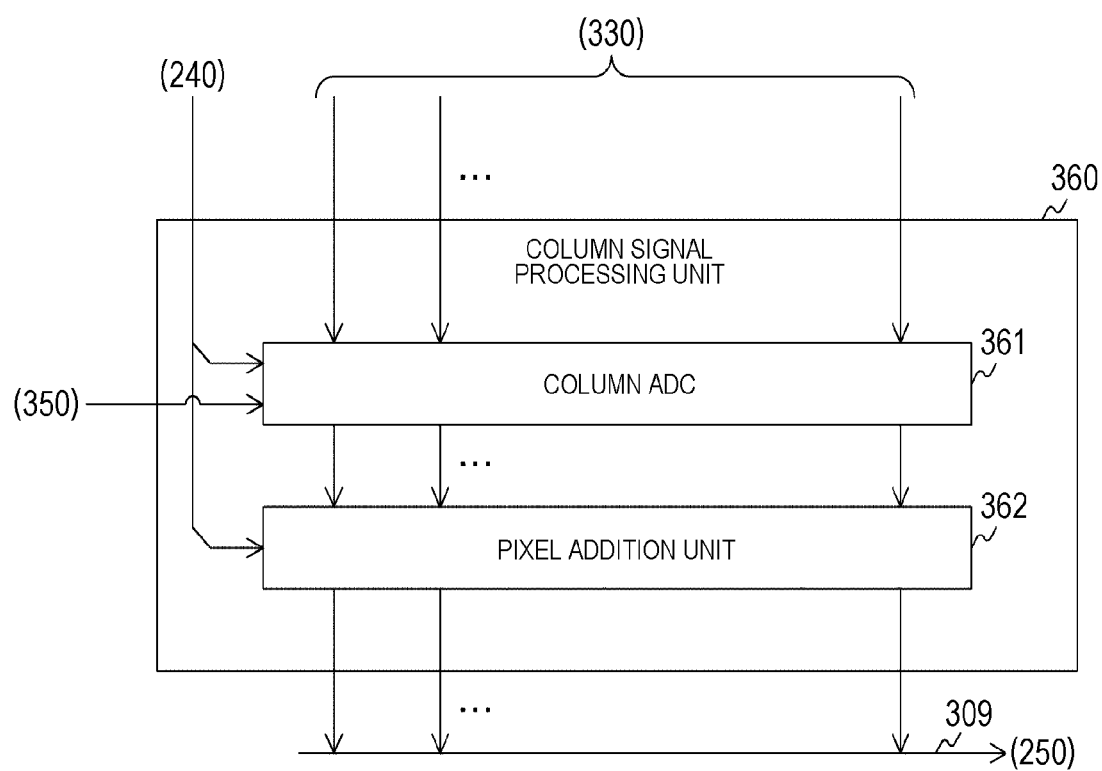
FIG. 6 is a block diagram illustrating a configuration example of a column signal processing unit according to the first embodiment of the present technology.

FIG. 6 is a block diagram illustrating a configuration example of the column signal processing unit 360 according to the first embodiment of the present technology. The column signal processing unit 360 includes a column ADC 361 and a pixel addition unit 362.

The column ADC 361 performs AD conversion processing on a pixel signal for each of columns. The column ADC 361 includes, for example, the same number of Analog to Digital Converters (ADCs) as the number of columns, and each of the ADCs performs AD conversion on pixel signals from the corresponding columns. Furthermore, the column ADC 361 reduces the bit depth in the AD conversion in accordance with the imaging control signal. The bit depth is reduced by, for example, truncating lower bits of pixel data. For example, the control unit 240 does not cause the column ADC 361 to perform truncation in a case where the remaining battery level is greater than a predetermined threshold, and causes the column ADC 361 to truncate the least significant bit in a case where the remaining battery level is less than the threshold. Furthermore, the control unit 240 causes the column ADC 361 to perform truncation so that the lower the remaining battery level, the more the bit depth to be truncated. Subsequently, the column ADC 361 supplies each of pieces of the AD-converted pixel data to the pixel addition unit 362. Note that the column ADC is an example of the analog-to-digital conversion unit described in the claims.

The pixel addition unit 362 performs pixel addition in accordance with the imaging control signal. For example, the pixel addition unit 362 performs horizontal pixel addition of adding a plurality of pieces of pixel data adjacent in the horizontal direction. Note that the pixel addition unit 362 may further perform vertical pixel addition of adding a plurality of pieces of pixel data adjacent in the vertical direction. The pixel addition unit 362 outputs the data after the pixel addition to the image processing unit 250.

Note that the column ADC 361 may further perform Correlated Double Sampling (CDS) processing. Furthermore, the column signal processing unit 360 may further include an amplifier that amplifies pixel data by digital gain, for each of columns.

[Exemplary Configuration of Image Processing Unit]

Figure 7:
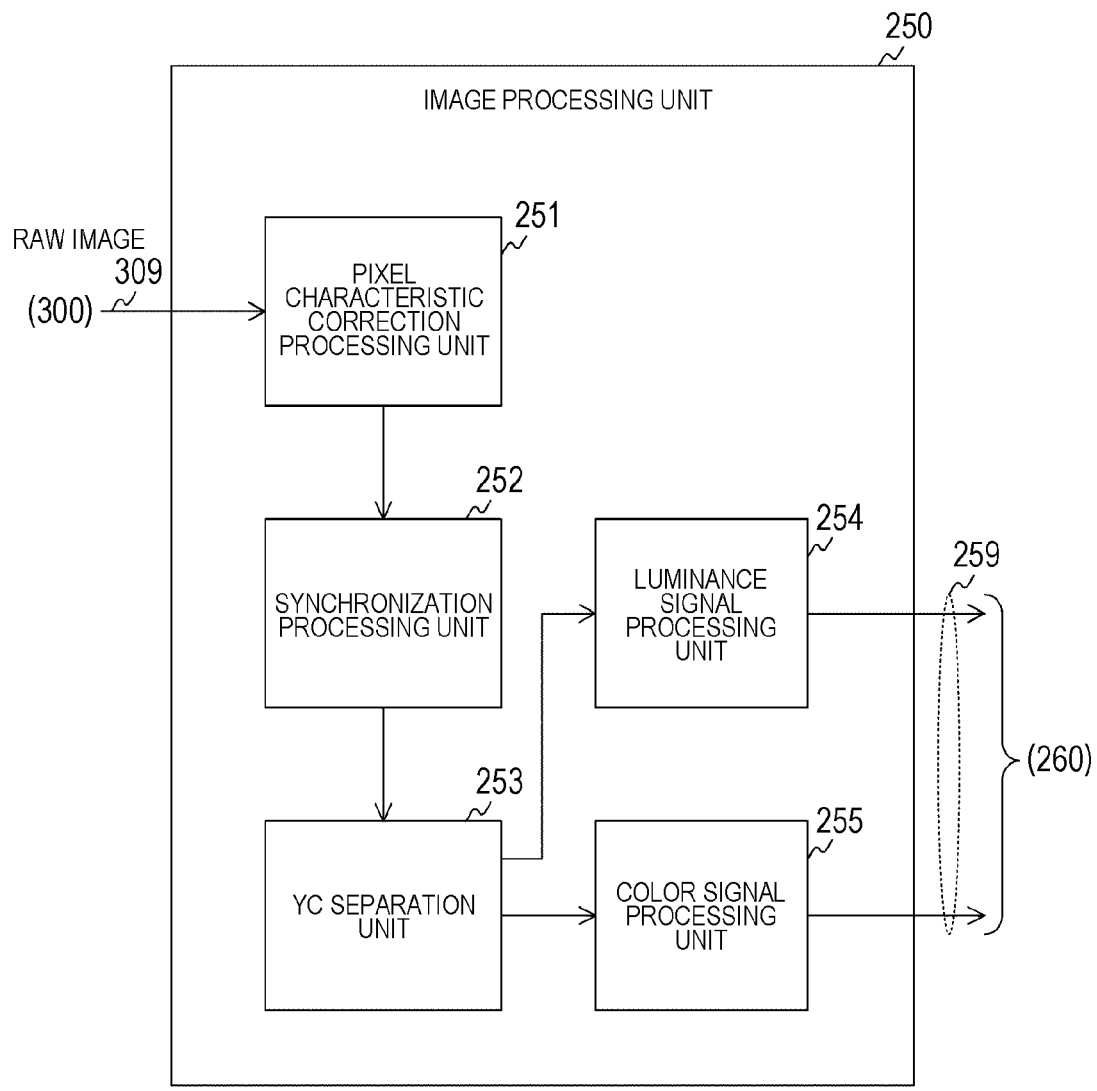
FIG. 7 is a block diagram illustrating a configuration example of an image processing unit according to the first embodiment of the present technology.

FIG. 7 is a block diagram illustrating a configuration example of the image processing unit 250 according to the first embodiment of the present technology. The image processing unit 250 includes a pixel characteristic correction processing unit 251, a synchronization processing unit 252, a YC separation unit 253, a luminance signal processing unit 254, and a color signal processing unit 255.

The pixel characteristic correction processing unit 251 performs various types of processing for correcting pixel characteristics on the image data from the solid-state imaging element 300. The pixel characteristic correction processing unit 251 executes defect correction processing, noise reduction processing, High-Dynamic-Range (HDR) combining processing, and shading correction processing, for example. The pixel characteristic correction processing unit 251 supplies the processed image data to the synchronization processing unit 252.

The synchronization processing unit 252 performs synchronization processing of interpolating missing color information among R, G, and B from the surroundings in each of pixels. This synchronization processing is also called demosaic processing. The synchronization processing unit 252 supplies the processed image data to the YC separation unit 253.

The YC separation unit 253 performs YC separation processing for converting (in other words, separating) R, G, and B into luminance signals and color signals for each of pixels in the image data. The YC separation unit 253 supplies the luminance signal to the luminance signal processing unit 254 and supplies the color signal to the color signal processing unit 255.

The luminance signal processing unit 254 executes various types of signal processing such as sharpening processing and noise reduction processing on the luminance signal. The luminance signal processing unit 254 supplies the processed luminance signal to the encoding unit 260.

The color signal processing unit 255 executes various types of signal processing such as color tone correction processing and noise reduction processing on color signals. The color signal processing unit 255 supplies the processed luminance signal to the encoding unit 260.

[Configuration Example of Encoding Unit]

Figure 8:
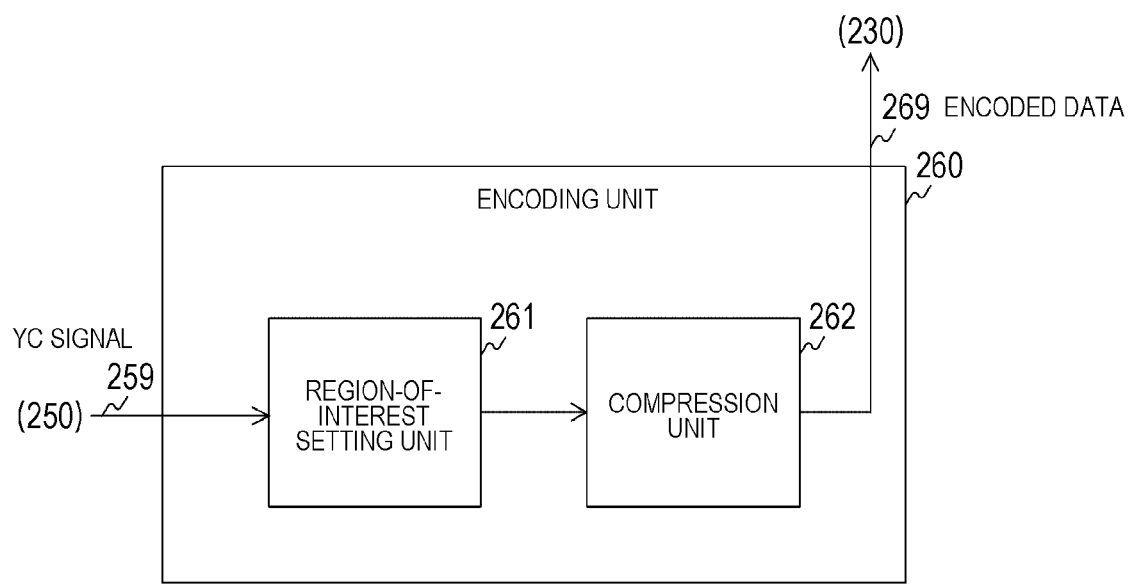
FIG. 8 is a block diagram illustrating a configuration example of an encoding unit according to the first embodiment of the present technology.

FIG. 8 is a block diagram illustrating a configuration example of the encoding unit 260 according to the first embodiment of the present technology. The encoding unit 260 includes a region-of-interest setting unit 261 and a compression unit 262.

The region-of-interest setting unit 261 sets a specific region in the image data as a region-of-interest (ROI). For example, the region-of-interest setting unit 261 detects a moving object using a background difference method, an inter-frame difference method, or the like, and sets the region of the moving object as an ROI. Alternatively, the region-of-interest setting unit 261 recognizes a specific object such as a face or character in the image data by object recognition, and sets the region of the object as an ROI. The region-of-interest setting unit 261 supplies ROI information indicating the size and position of the ROI to the compression unit 262 together with image data.

The compression unit 262 compresses image data using a Joint Photographic Experts Group (JPEG) method or the like. At the time of compression, the compression unit 262 uses a ROI compression rate lower than non-ROI regions. Subsequently, the compression unit 262 supplies moving image data including a plurality of pieces of compressed image data in time series order, to the communication unit 230 as encoded data. In this manner, a method for compressing each of pieces of image data in the moving image data by the JPEG method is referred to as a Motion-JPEG method. Note that the compression unit 262 can also compress moving image data using another compression method such as Moving Picture Experts Group (MPEG)-4 method instead of the Motion-JPEG method.

Note that the encoding unit 260 may further include an encryption unit that encrypts the compressed data, in addition to the region-of-interest setting unit 261 and the compression unit 262.

Figure 9:
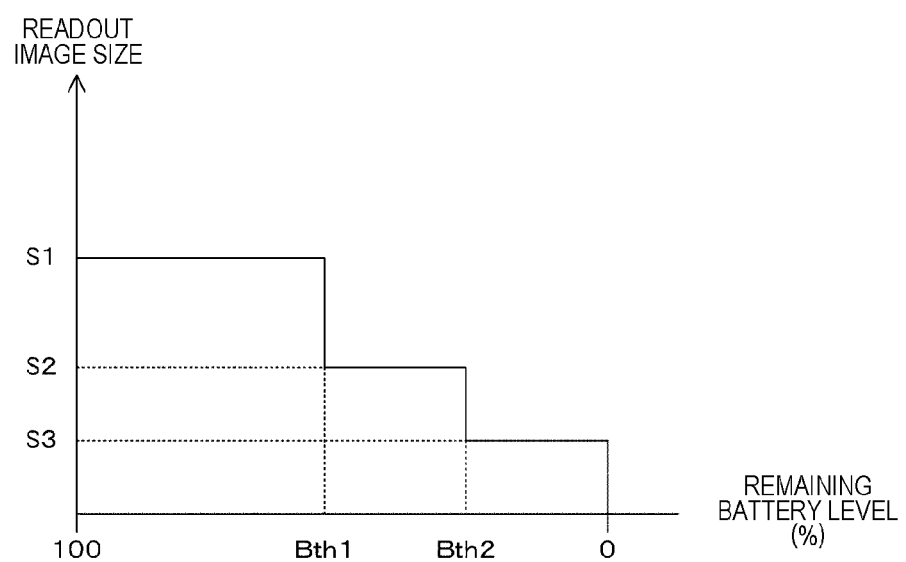
FIG. 9 is a graph illustrating an example of a relationship between a remaining battery level and a readout image size according to the first embodiment of the present technology.

FIG. 9 is a graph illustrating an example of a relationship between a remaining battery level and a readout image size according to the first embodiment of the present technology. In the figure, the vertical axis indicates the readout image size, and the horizontal axis indicates the remaining battery level.

In a case where the remaining battery level is Bth1 or more, the control unit 240 controls the readout image size to a maximum value S1. Furthermore, in a case where the remaining battery level is less than Bth1 and Bth2 or more, the control unit 240 controls the readout image size to S2 smaller than S1. Furthermore, in a case where the remaining battery level is less than Bth2, the control unit 240 controls the readout image size to S3 smaller than S2.

In this manner, the control unit 240 reduces the readout image size stepwise together with the decrease in the remaining battery level. This is because the readout image size can be controlled only stepwise in thinning readout and pixel addition. For example, in a case where one column is thinned out every two rows or two columns and pixel addition is not performed in the horizontal direction and the vertical direction, the readout image size will be ¼. In a case where two columns are thinned out every three rows or three columns and pixels addition is not performed in the horizontal direction and the vertical direction, the readout image size will be ⅑. Furthermore, in a case where two adjacent pixels are added and not thinned out in the horizontal direction and the vertical direction, the readout image size will be ¼.

Figure 10:
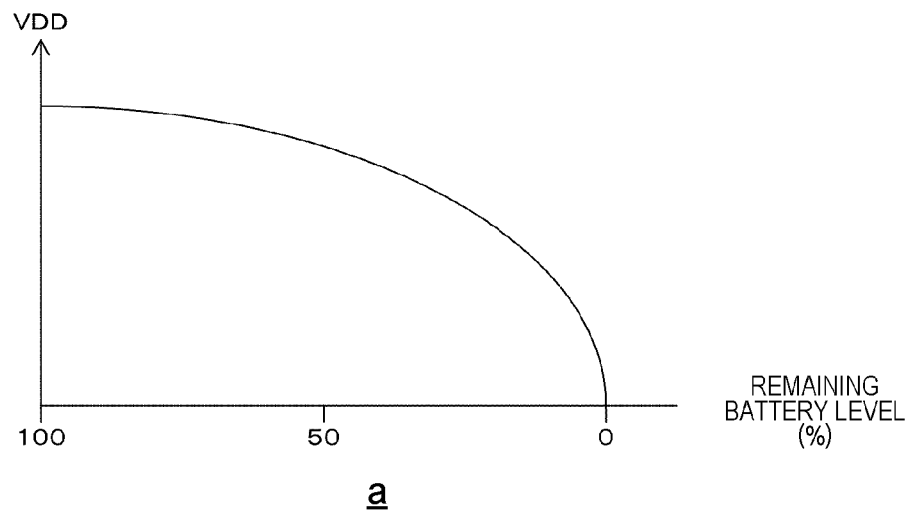
FIG. 10 is a graph illustrating an example of a relationship between the remaining battery level, the drive voltage, and the noise level in the first embodiment of the present technology.
Figure 10:
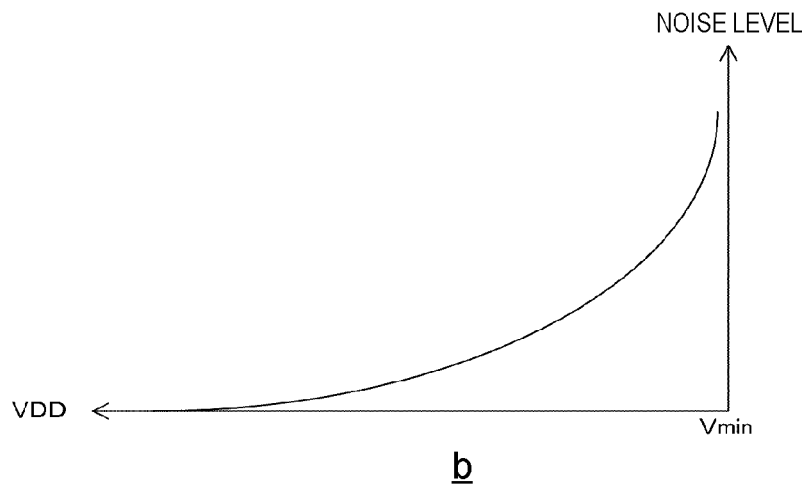
Figure 10:
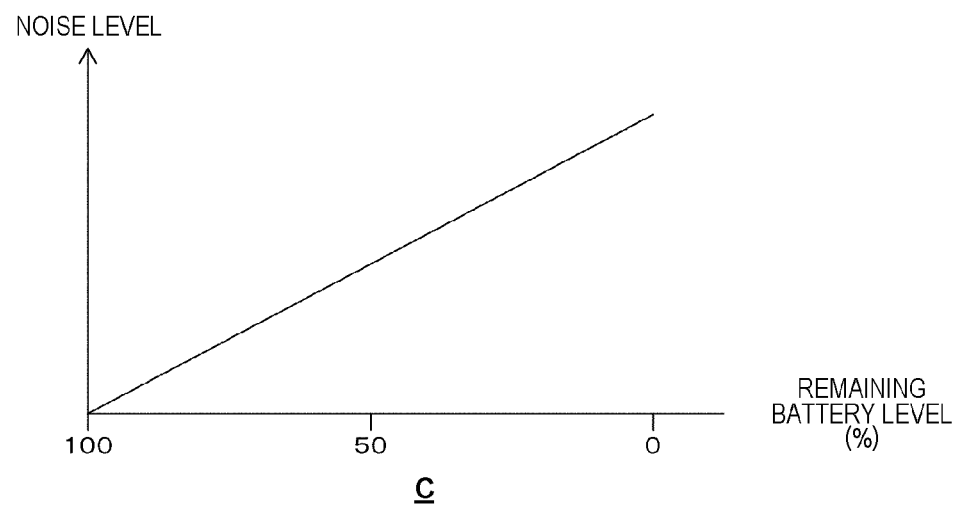

FIG. 10 is a graph illustrating an example of a relationship between the remaining battery level, the drive voltage, and the noise level in the first embodiment of the present technology. In the figure, a is a graph illustrating an example of a relationship between the drive voltage VDD and the remaining battery level. In a of the figure, the vertical axis represents the drive voltage VDD, and the horizontal axis represents the remaining battery level. In the figure, b is a graph illustrating an example of a relationship between the noise level and the drive voltage VDD. In b of the figure, the vertical axis represents the noise level, and the horizontal axis represents the drive voltage VDD. Vmin indicates the minimum value of the drive voltage VDD. In the figure, c is a graph illustrating an example of a relationship between the noise level and the remaining battery level. In c of the figure, the vertical axis represents the noise level, and the horizontal axis represents the remaining battery level.

As illustrated in a in FIG. 10, the control unit 240 controls the drive voltage VDD to a logarithmic value of the remaining battery level. The drive voltage VDD is controlled to a value represented by the following formula, for example.

$$y = a \times \log(x-b)$$

In the above formula, y is the drive voltage VDD, and the unit is volt (V), for example. x is the remaining battery level, and the unit is percent (%), for example. a and b are predetermined real numbers.

Furthermore, as described above with reference to FIG. 5, decreasing the drive voltage VDD increases the noise level. As illustrated in b in FIG. 10, the lower the drive voltage VDD, the more the noise level increases exponentially. Accordingly, when the control unit 240 decreases the drive voltage VDD logarithmically as illustrated in the above formula together with the decrease in the remaining battery level, the noise level increases linearly together with the decrease in the remaining battery level as illustrated in c in FIG. 10. This enables quality of the image data to be linearly degraded together with the decrease in the remaining battery level. Degrading the image quality linearly enables the user to intuitively grasp the transition of the remaining battery level.

Figure 11:
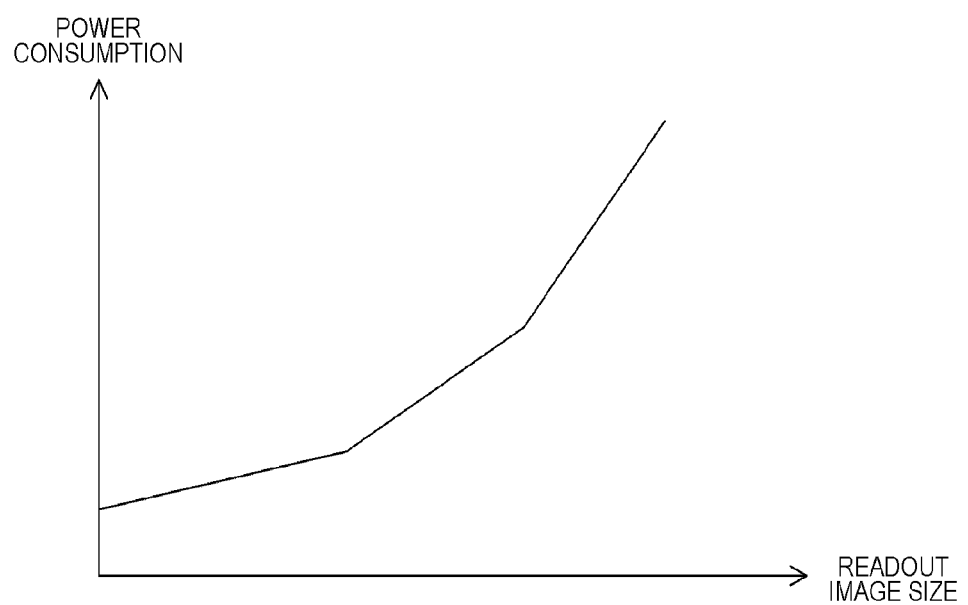
FIG. 11 is a graph illustrating an example of a relationship between a readout image size and power consumption in the first embodiment of the present technology.

FIG. 11 is a graph illustrating an example of a relationship between a readout image size and power consumption in the first embodiment of the present technology. In the figure, the vertical axis indicates the power consumption of the entire imaging apparatus 200, and the horizontal axis indicates the readout image size (resolution). As illustrated in the figure, the smaller the readout image size, the lower the power consumption. This is because the smaller the readout image size, the lower the load on the image processing unit 250 and the encoding unit 260 and the slower the communication speed of the communication unit 230 can be achieved.

Figure 12:
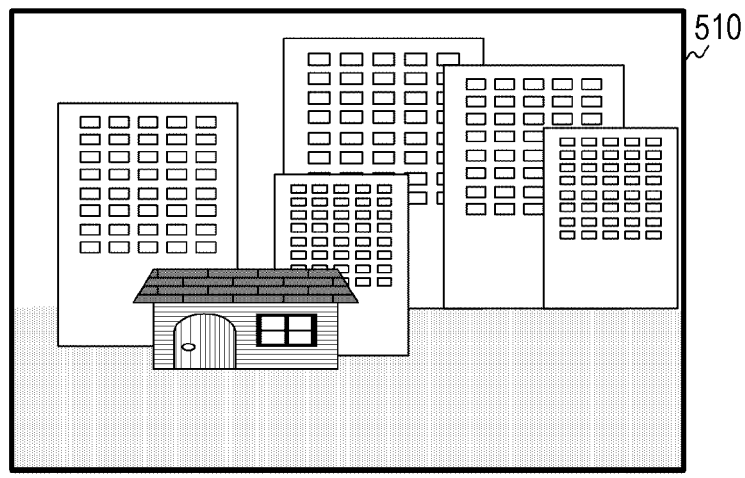
FIG. 12 is a diagram illustrating an example of image data for each of remaining battery levels in the first embodiment of the present technology.
Figure 12:
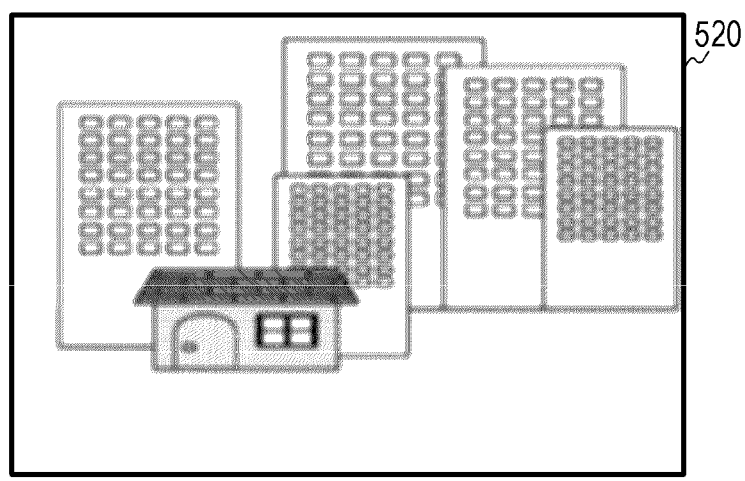
Figure 12:
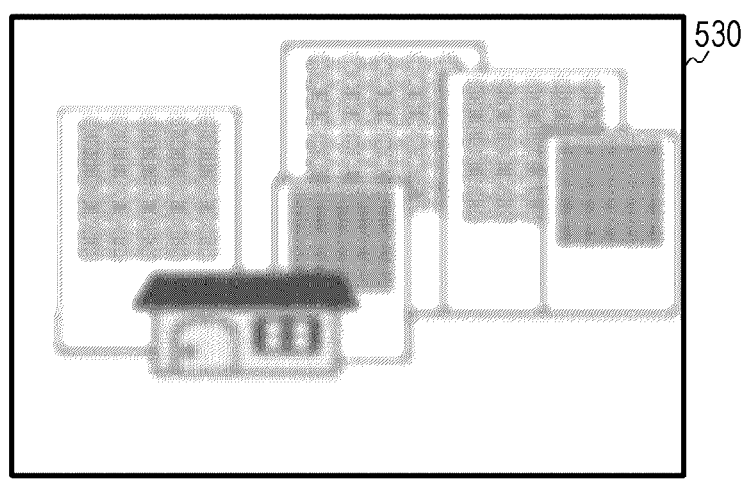

FIG. 12 is a diagram illustrating an example of image data for each of remaining battery levels in the first embodiment of the present technology. In the figure, a is a diagram illustrating an example of image data 510 when the remaining battery level is 100 percent (%). In the figure, b is a diagram illustrating an example of image data 520 when the remaining battery level is 50 percent (%). In the figure, c is a diagram illustrating an example of image data 530 when the remaining battery level is 25 percent (%).

In a case where the remaining battery level is 100 percent (%), the control unit 240 maximizes the drive voltage VDD and the amount of the image data. This achieves the highest image quality of the image data 510. Furthermore, in a case where the remaining battery level is 100 percent (%), the control unit 240 lowers the drive voltage VDD and the data amount more than the time when the remaining battery level is 100 percent (%). This degrades the image quality of the image data 520 to be lower than the time when the remaining battery level is 100 percent (%). Furthermore, in a case where the remaining battery level is 25 percent (%), the control unit 240 lowers the drive voltage VDD and the data amount more than the time when the remaining battery level is 50 percent (%). This further degrades the image quality of the image data 530 to be lower than the time when the remaining battery level is 50 percent (%).

Figure 13:
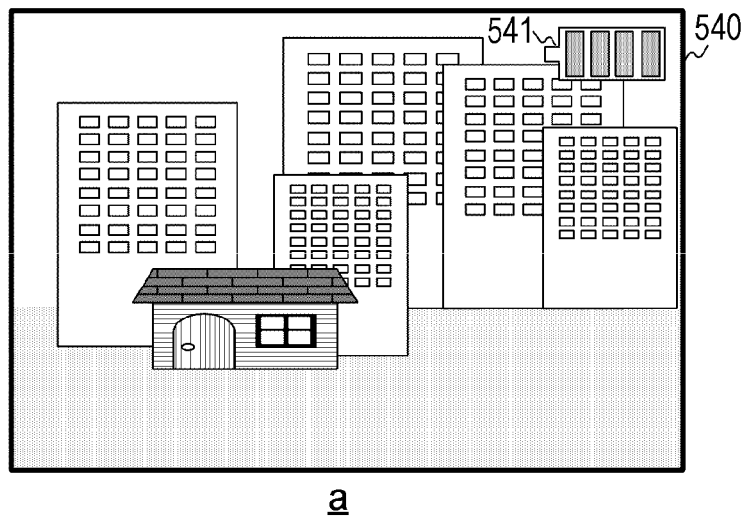
FIG. 13 is a diagram illustrating an example of image data for each of remaining battery levels in a comparative example.
Figure 13:
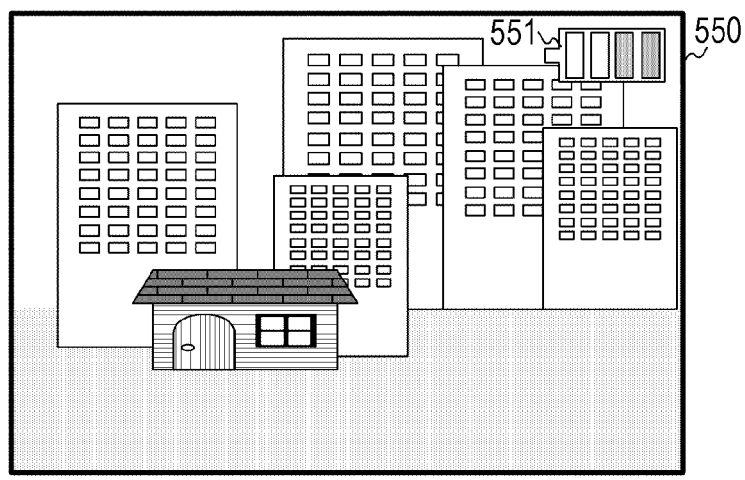
Figure 13:
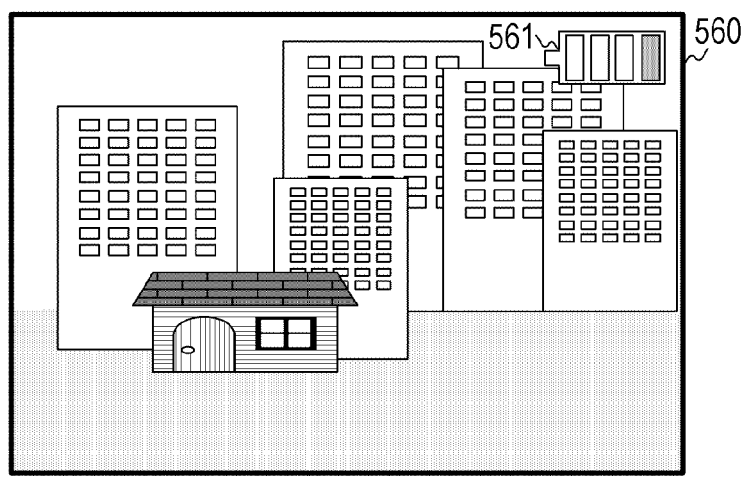

FIG. 13 is a diagram illustrating an example of image data for each of remaining battery levels in a comparative example in which the data amount, the frame rate, and the drive voltage VDD are not controlled in accordance with the remaining battery level. Furthermore, this comparative example is to use an icon to display the remaining battery level on the image data. In the figure, a is a diagram illustrating an example of image data 540 when the remaining battery level is 100 percent (%). In the figure, b is a diagram illustrating an example of image data 550 when the remaining battery level is 50 percent (%). In the figure, c is a diagram illustrating an example of image data 560 when the remaining battery level is 25 percent (%).

The image data 540 includes an icon 541 displayed to indicate that the remaining battery level is 100 percent (%). The image data 550 includes an icon 551 displayed to indicate that the remaining battery level is 50 percent (%).

The image data 560 includes an icon 561 displayed to indicate that the remaining battery level is 25 percent (%). The data amount, the frame rate, and the drive voltage VDD are not controlled in accordance with the remaining battery level in the comparative example, resulting in the image data having the same image quality.

Although the remaining battery level can be confirmed by an icon in this comparative example, it would be difficult to reduce the power consumption because the data amount, the frame rate, and the drive voltage VDD are not controlled. Therefore, it is difficult in the comparative example to extend the battery drive time.

In contrast, the imaging apparatus 200 can control so that that lower the remaining battery level, the lower the data amount, the frame rate, and the drive voltage VDD. Accordingly, it is possible to dramatically reduce the power consumption, leading to extension of the drive time on the battery. In particular, IoT cameras are often required to be driven for a long time on a small-capacity battery, and this requirement can be met by controlling the amount of data or the like. Furthermore, since the image quality gradually decreases together with the decrease in the remaining battery level, the user can intuitively grasp the remaining battery level.

Furthermore, an icon displayed in the comparative example to provide notification of the remaining battery level might hinder user's visual recognition of a portion overlapping with this icon in a case where the imaging apparatus is used for monitoring. This might also hinder monitoring operations. Furthermore, in the case of detecting a suspicious person or the like by image processing on the server side, embedding an icon within image data might cause generation of a difference in that portion from the data at the time of imaging, leading to deterioration of the detection accuracy.

In contrast, since the imaging apparatus 200 does not display an icon, the user can visually recognize the entire image data. In addition, it is possible to prevent deterioration of detection accuracy.

[Operation Example of Imaging Apparatus]

Figure 14:
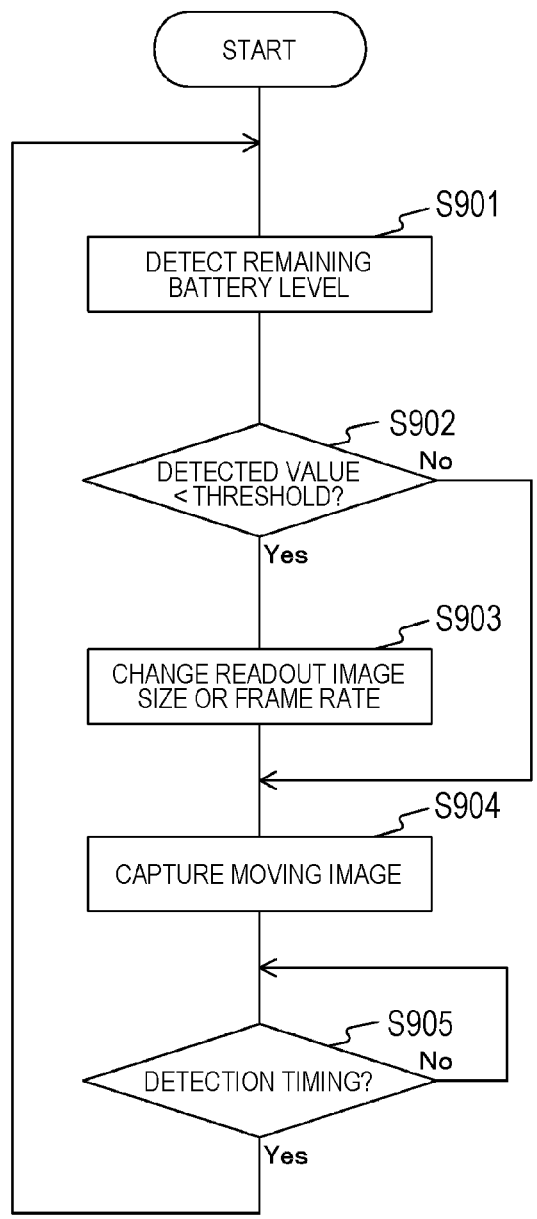
FIG. 14 is a flowchart illustrating an example of operation of the imaging apparatus according to the first embodiment of the present technology.

FIG. 14 is a flowchart illustrating an example of operation of the imaging apparatus 200 according to the first embodiment of the present technology. This operation is started at execution of a predetermined application for causing the imaging apparatus 200 to capture image data, for example.

First, the imaging apparatus 200 detects a remaining battery level (step S901). Subsequently, the imaging apparatus 200 determines whether or not the detected value is less than a largest threshold (step S902). In a case where the detected value is less than the threshold (step S902: Yes), the imaging apparatus 200 changes the readout image size or the frame rate in accordance with the detected value so as to reduce the image quality (step S903).

In a case where the detected value is the threshold or more (step S902: No), or after step S903, the imaging apparatus 200 captures a moving image with the set readout image size and the frame rate (step S904). After step S904, the imaging apparatus 200 determines whether or not the current time is the detection timing of the remaining battery level (step S905). In a case where the time is not the detection timing of the remaining battery level (step S905: No), the imaging apparatus 200 repeats step S905 and subsequent steps. Meanwhile, in a case where it is the detection timing of the remaining battery level (step S905: Yes), the imaging apparatus 200 repeatedly executes step S901 and subsequent steps.

In this manner, according to the first embodiment of the present technology, the solid-state imaging element 300 captures image data in synchronization with the vertical synchronization signal so that the lower the remaining battery level of the battery 210, the smaller the data amount of the image data. With this imaging, the lower the remaining battery level, the more the power consumption can be reduced. With this configuration, it is possible to extend the drive time on the battery 210.

2. Second Embodiment

In the first embodiment described above, the solid-state imaging element 300 alone is controlled to reduce the power consumption. However, controlling the solid-state imaging element 300 alone cannot sufficiently reduce the power consumption in some cases. For example, controlling the processing volume of the image processing unit 250 at the subsequent stage of the solid-state imaging element 300 in accordance with the remaining battery level can further reduce the power consumption. The imaging apparatus 200 according to a second embodiment is different from the first embodiment in that the processing volume of image processing is further controlled in accordance with the remaining battery level.

Figure 15:
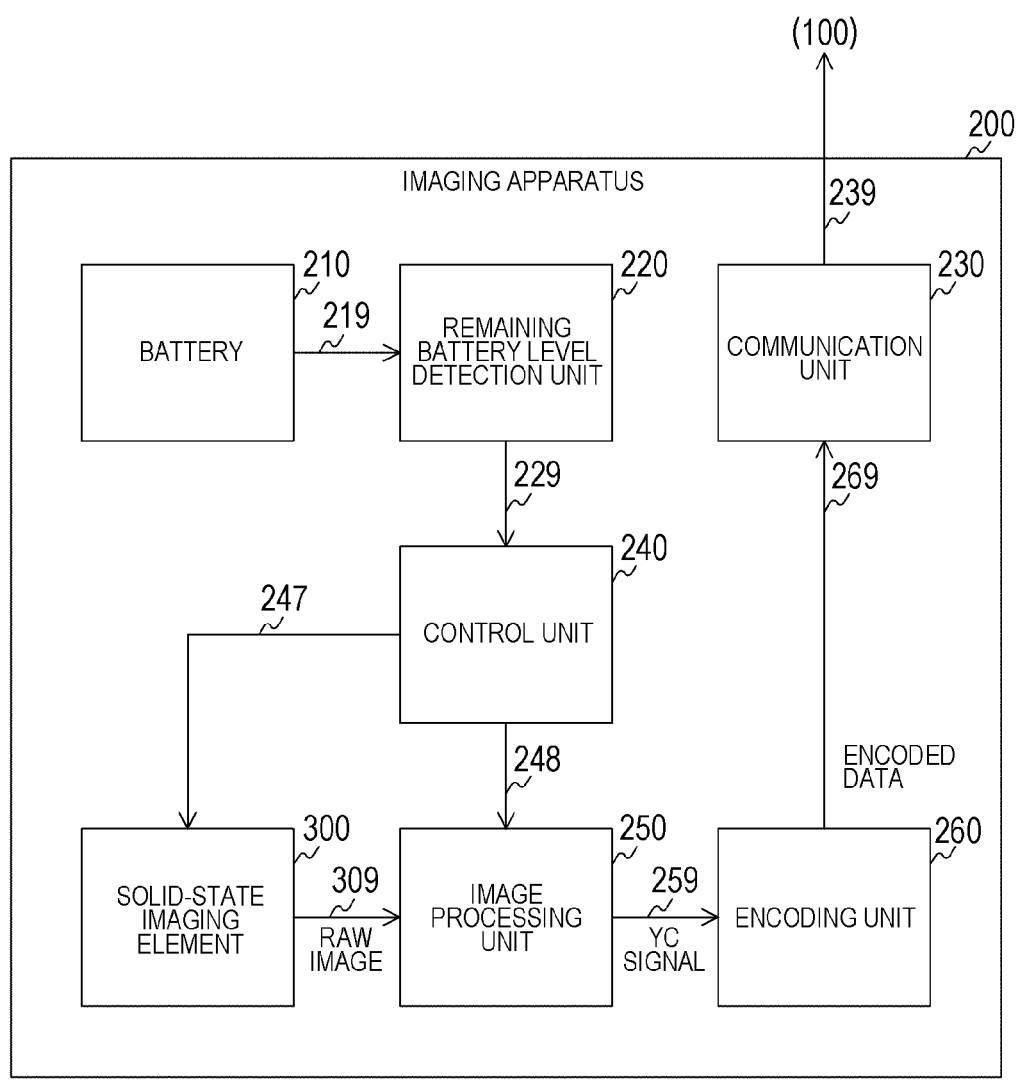
FIG. 15 is a block diagram illustrating a configuration example of an imaging apparatus according to a second embodiment of the present technology.

FIG. 15 is a block diagram illustrating a configuration example of the imaging apparatus 200 according to the second embodiment of the present technology. The imaging apparatus 200 according to the second embodiment is different from the first embodiment in that the control unit 240 further controls the image processing unit 250. The control unit 240 generates an Image Signal Processor (ISP) control signal and supplies the signal to the image processing unit 250 via a signal line 248.

Figure 16:
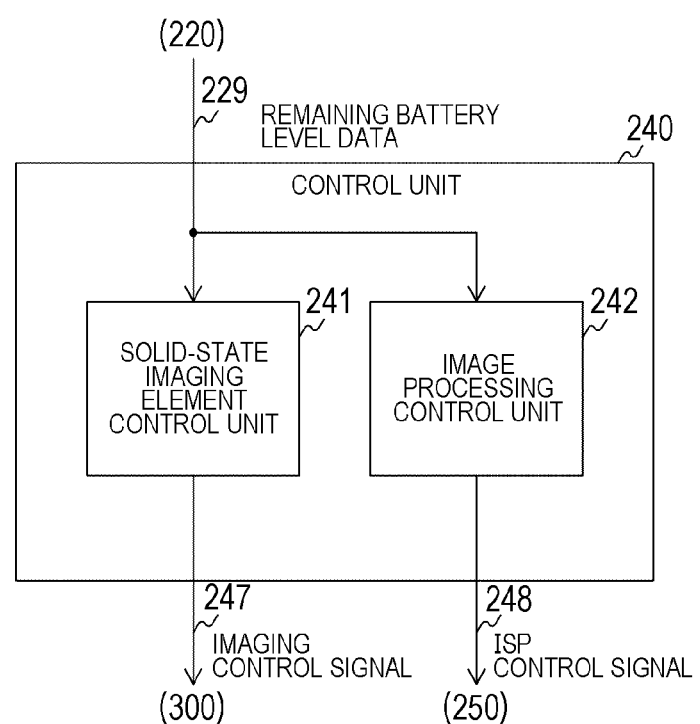
FIG. 16 is a block diagram illustrating a configuration example of a control unit according to the second embodiment of the present technology.

FIG. 16 is a block diagram illustrating a configuration example of the control unit 240 according to the second embodiment of the present technology. The control unit 240 of the second embodiment differs from the first embodiment in that it further includes an image processing control unit 242.

The image processing control unit 242 uses the ISP control signal to control the image processing unit 250 so that the lower the remaining battery level, the smaller the volume of image processing is to be executed. For example, the image processing control unit 242 reduces the processing volume by stopping some of the various types of processing executed by the image processing unit 250.

Figure 17:
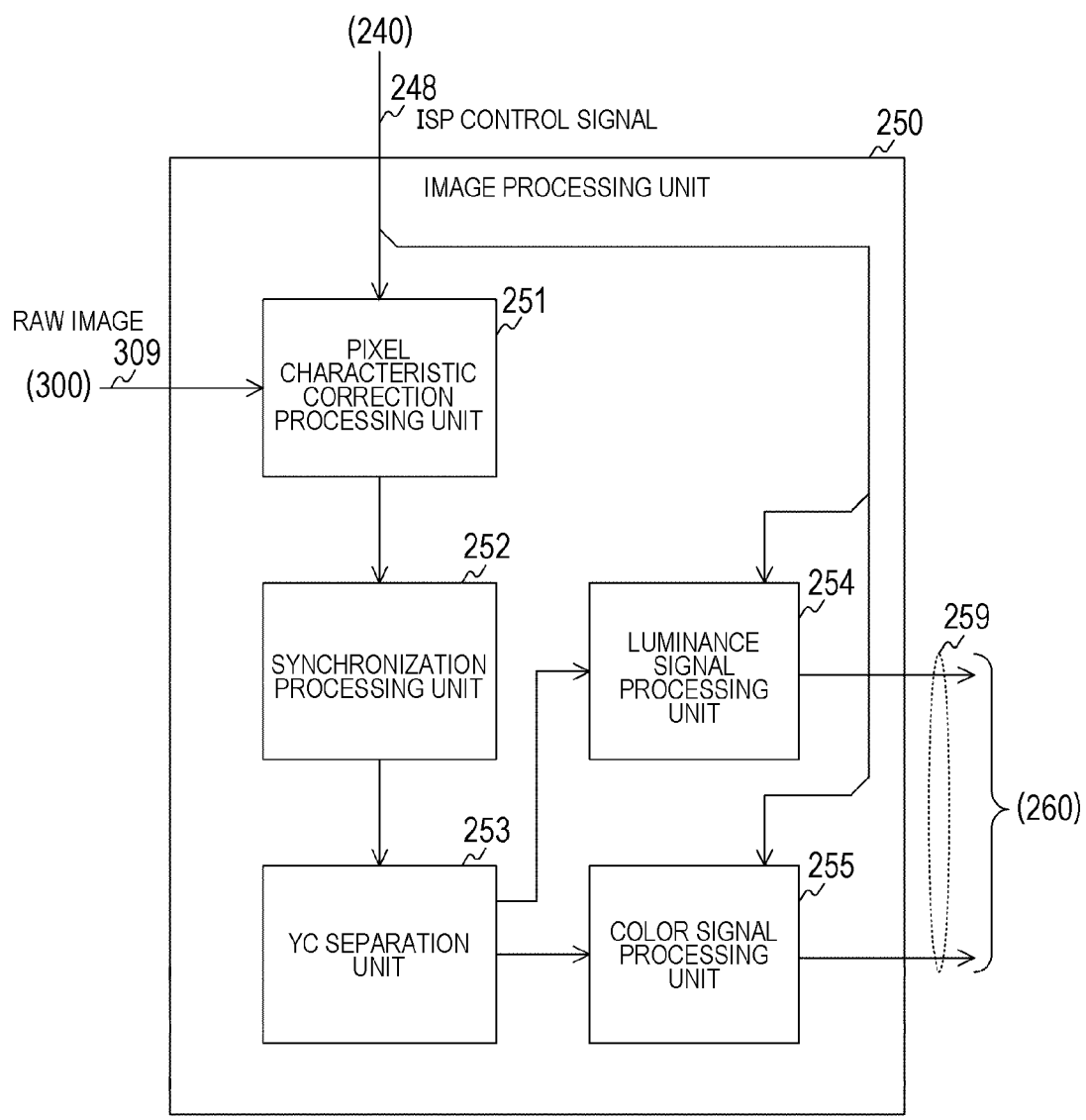
FIG. 17 is a block diagram illustrating a configuration example of an image processing unit according to the second embodiment of the present technology.

FIG. 17 is a block diagram illustrating a configuration example of the image processing unit 250 according to the second embodiment of the present technology. The pixel characteristic correction processing unit 251 according to the second embodiment performs defect correction processing, noise reduction processing, or the like as necessary in accordance with the ISP control signal.

Furthermore, the luminance signal processing unit 254 according to the second embodiment executes sharpening processing, noise reduction processing, or the like as necessary in accordance with the ISP control signal. The color signal processing unit 255 of the second embodiment also performs color tone correction processing, noise reduction processing, or the like as necessary in accordance with the ISP control signal.

When the remaining battery level falls below a threshold, the control unit 240 stops at least one of the processes executed by the pixel characteristic correction processing unit 251. Furthermore, when the remaining battery level falls below the threshold, the control unit 240 stops at least one of the processes executed by each of the luminance signal processing unit 254 and the color signal processing unit 255. The control unit 240 performs control so that the lower the remaining battery level, the more the number of processes to be stopped, thereby reducing the processing volume of the image processing unit 250. Furthermore, the control unit 240 preferentially stops the processing for the color signal. For example, the control unit 240 stops the processing on the color signal when the remaining battery level falls below the threshold, and further stops the processing on the luminance signal when the remaining battery level further falls. By reducing the processing volume of the image processing unit 250, the power consumption of the imaging apparatus 200 can be further reduced.

In this manner, in the second embodiment of the present technology, the image processing unit 250 performs image processing so that the lower the remaining battery level of the battery 210, the smaller the processing volume to be executed, making it possible to further reduce the power consumption. With this configuration, it is possible to further extend the drive time on the battery 210.

3. Third Embodiment

In the second embodiment described above, the solid-state imaging element 300 and image processing unit 250 alone are controlled to reduce the power consumption. However, controlling these units alone cannot sufficiently reduce the power consumption in some cases. For example, controlling the compression rate at the encoding unit 260 at the subsequent stage of the image processing unit 250 in accordance with the remaining battery level can further reduce the power consumption. The imaging apparatus 200 according to the second embodiment is different from the second embodiment in that the compression rate is further controlled in accordance with the remaining battery level.

Figure 18:
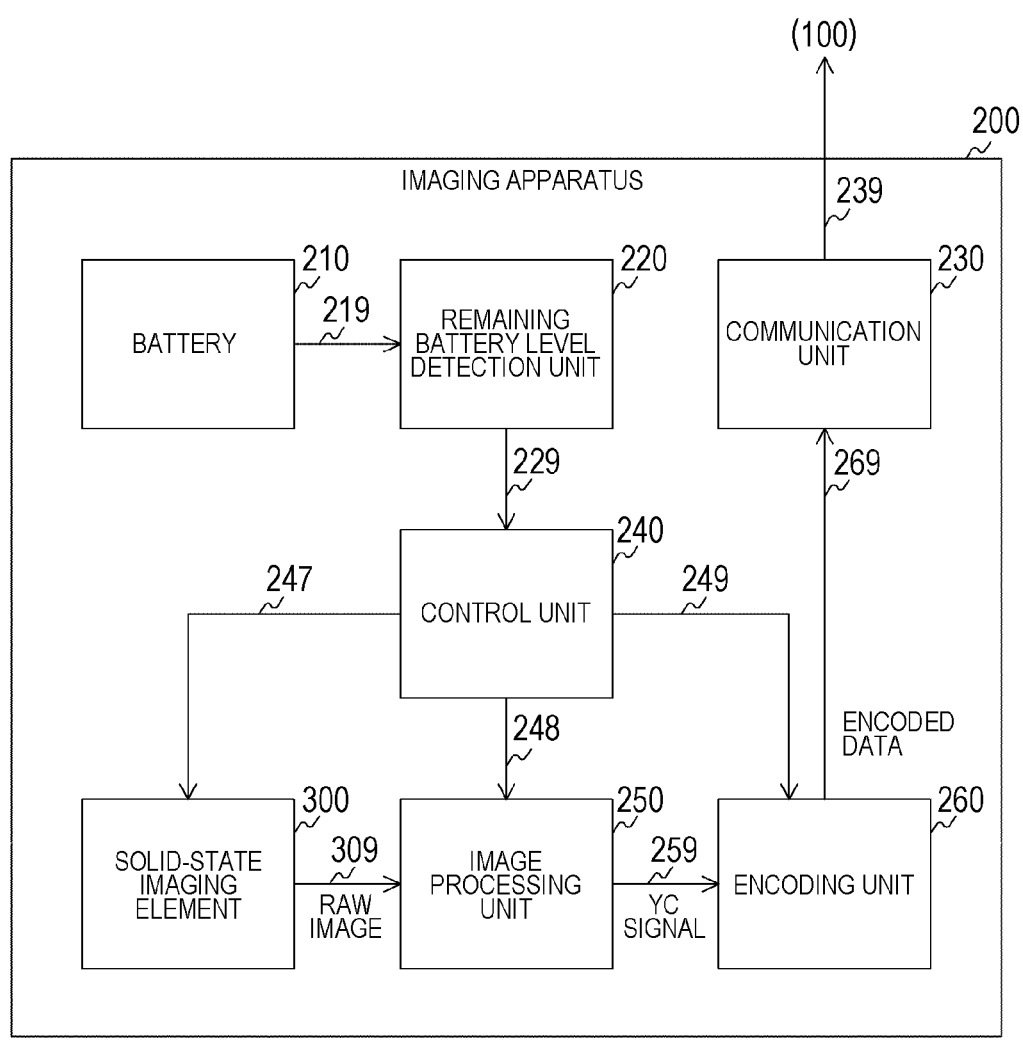
FIG. 18 is a block diagram illustrating a configuration example of an imaging apparatus according to a third embodiment of the present technology.

FIG. 18 is a block diagram illustrating a configuration example of the imaging apparatus 200 according to a third embodiment of the present technology. The imaging apparatus 200 according to the third embodiment is different from the second embodiment in that the control unit 240 further controls the encoding unit 260. The control unit 240 generates an encoding parameter and supplies it to the encoding unit 260 via a signal line 249. This encoding parameter includes the area of ROI, the compression rate of ROI, and the compression rate of non-ROI regions.

Figure 19:
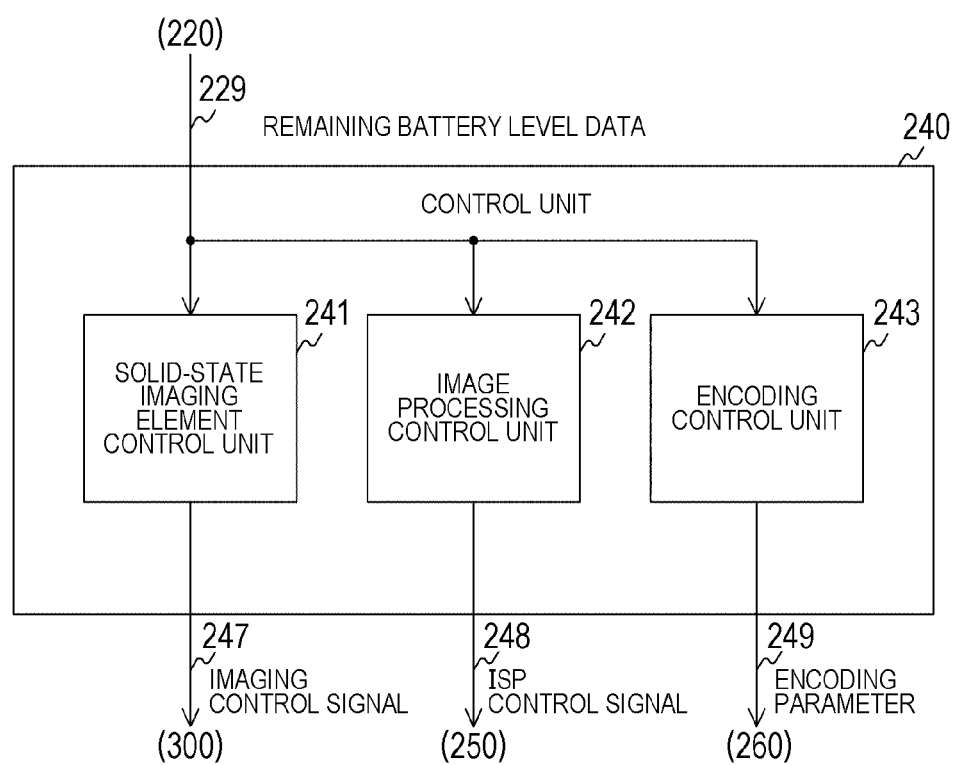
FIG. 19 is a block diagram illustrating a configuration example of a control unit according to the third embodiment of the present technology.

FIG. 19 is a block diagram illustrating a configuration example of the control unit 240 according to the third embodiment of the present technology. The control unit 240 of the third embodiment differs from the second embodiment in that it further includes an encoding control unit 243.

The encoding control unit 243 uses the encoding parameter and controls the encoding unit 260 so that the lower the remaining battery level, the higher the compression rate to be used to compress the image data.

Figure 20:
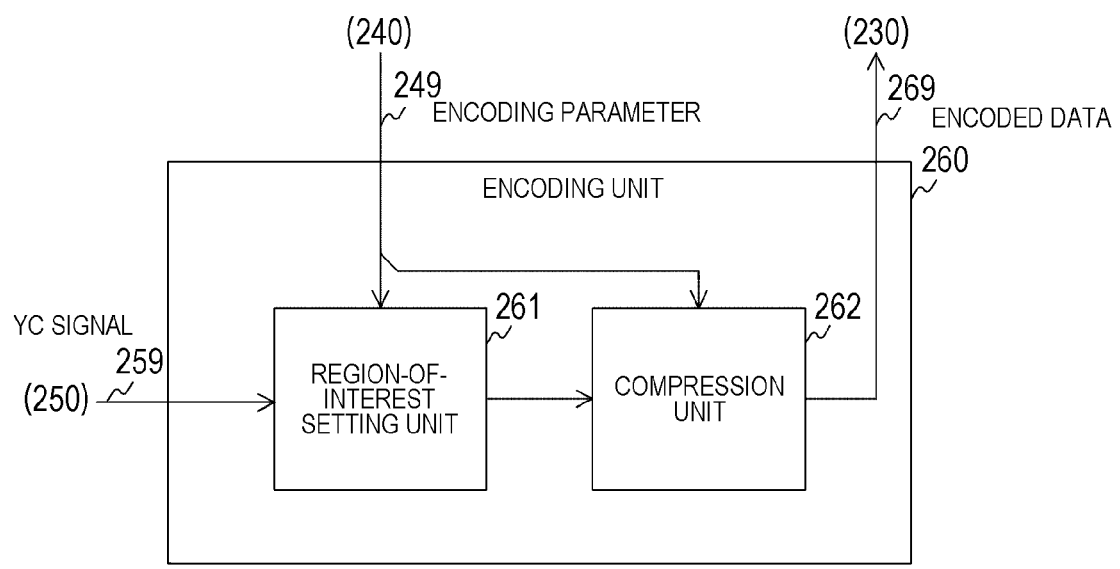
FIG. 20 is a block diagram illustrating a configuration example of an encoding unit according to the third embodiment of the present technology.

FIG. 20 is a block diagram illustrating a configuration example of the encoding unit 260 according to the third embodiment of the present technology. The region-of-interest setting unit 261 of the third embodiment sets the ROI having the area set by the encoding parameter. Furthermore, the compression unit 262 of the third embodiment compresses the YC signal at a compression rate set in the encoding parameter.

For example, the control unit 240 sets the ROI so that the lower the remaining battery level, the smaller the area of the ROI. Furthermore, the control unit 240 compresses the YC signal so that the lower the remaining battery level, the higher the compression rate to be used to compress the YC signal. The control unit 240 may control both the ROI area and the compression rate, or may control only one of them. The smaller the ROI area, the higher the compression rate of the entire encoded data can be obtained. With this configuration, it is possible to reduce the data size of the encoded data to decrease the communication amount of the communication unit 230, enabling further reduction of the power consumption.

Note that the control unit 240 controls all of the solid-state imaging element 300, the image processing unit 250, and the encoding unit 260, or may alternatively control only the solid-state imaging element 300 and the encoding unit 260.

Figure 21:
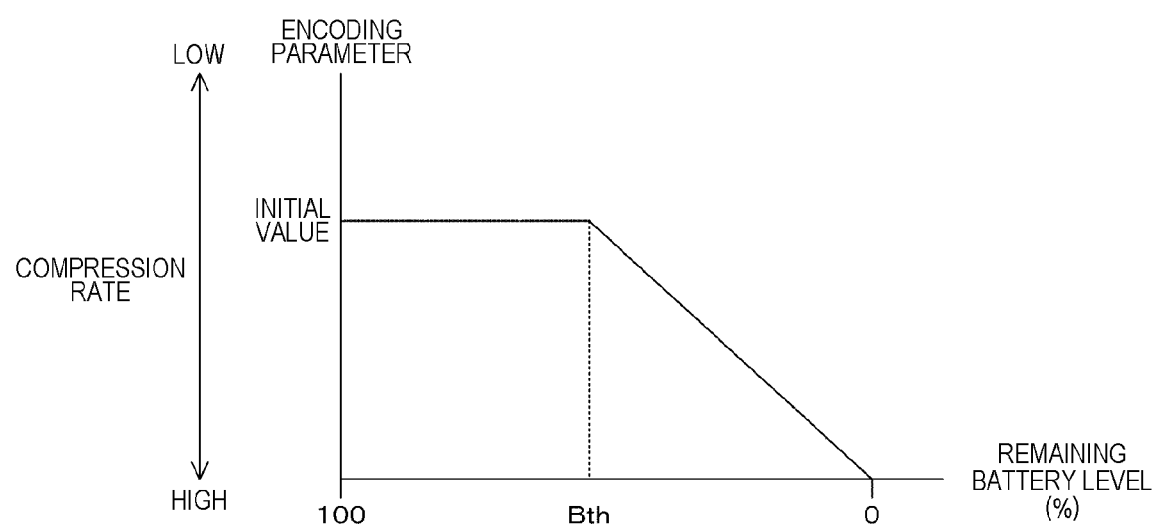
FIG. 21 is a graph illustrating an example of a relationship between a remaining battery level and a compression rate in the third embodiment of the present technology.

FIG. 21 is a graph illustrating an example of a relationship between a remaining battery level and a compression rate in the third embodiment of the present technology. In the figure, the vertical axis indicates the compression rate, and the horizontal axis indicates the remaining battery level. As illustrated in the figure, in a case where the remaining battery level is a threshold Bth or more, the compression rate is set to an initial value. Furthermore, in a case where the remaining battery level is less than the threshold Bth, a compression rate with a level proportional to the amount of decrease in the remaining battery level will be set.

In this manner, according to the third embodiment of the present technology, the encoding unit 260 compresses the YC signal so that the lower the remaining battery level of the battery 210, the higher the compression rate to be used. This makes it possible to reduce the data size of the encoded data, enabling reduction of the communication amount of the communication unit 230. With this configuration, it is possible to reduce the power consumption and further extend the drive time on the battery 210.

4. APPLICATION EXAMPLE

The technology according to the present disclosure can be applied to a technology called Internet of things (IoT). IoT is a mechanism in which an IoT device 9100, which is a "thing", is connected to other IoT devices 9003, the Internet, a cloud 9005, or the like, so as to achieve mutual control by exchanging information. IoT can be applied to various industries such as agriculture, home, automobile, manufacturing, distribution, and energy.

Figure 22:
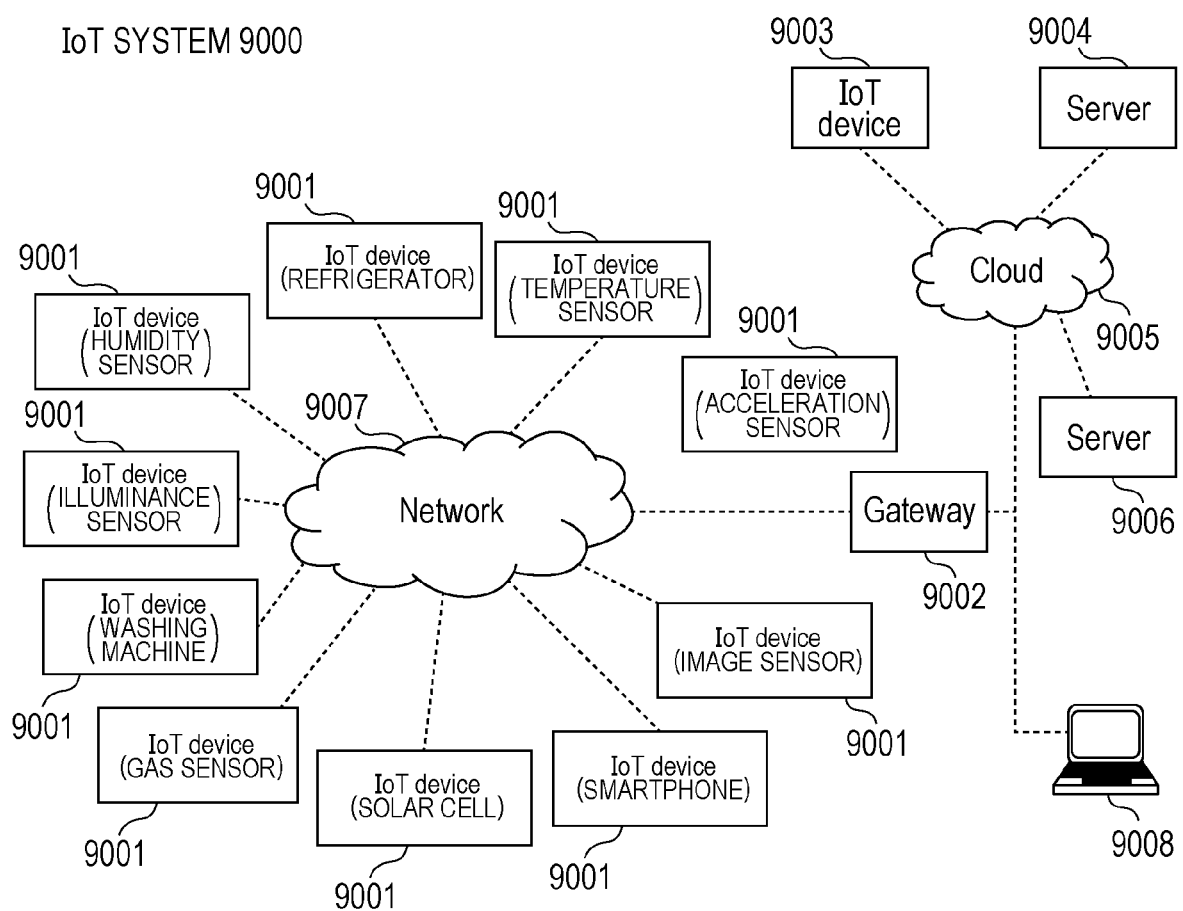
FIG. 22 is a diagram illustrating an example of a schematic configuration of an IoT system 9000 to which the technology according to the present disclosure can be applied.

FIG. 22 is a diagram illustrating an example of a schematic configuration of an IoT system 9000 to which the technology according to the present disclosure can be applied.

The IoT device 9001 includes various sensors such as a temperature sensor, a humidity sensor, an illuminance sensor, an acceleration sensor, a distance sensor, an image sensor, a gas sensor, and a human sensor, for example. Furthermore, the IoT device 9001 may include a terminal such as a smartphone, a mobile phone, a wearable terminal, or a game device. The IoT device 9001 is powered by an AC power source, a DC power source, a battery, non-contact power feeding referred to as energy harvesting, or the like. The IoT device 9001 can perform communication by wired, wireless, proximity wireless communication, or the like. Examples of preferably used communication methods include 3G/LTE, WiFi, IEEE802.15.4, Bluetooth, Zigbee (registered trademark), Z-Wave, or the like. The IoT device 9001 may perform communication by switching a plurality of these communication means.

The IoT device 9001 may form a one-to-one, star, tree, or mesh network. The IoT device 9001 may be connected to an external cloud 9005 directly or through a gateway 9002. An address is attached to the IoT device 9001 by IPv4, IPv6, 6LoWPAN, or the like. Data collected from the IoT device 9001 is transmitted to other IoT devices 9003, a server 9004, the cloud 9005, or the like. The timing and frequency of transmitting data from the IoT device 9001 may be preferably adjusted, and the data may be compressed and transmitted. Such data may be used as it is, or the data may be analyzed by a computer 9008 by various methods such as statistical analysis, machine learning, data mining, cluster analysis, discriminant analysis, combination analysis, and time series analysis. With the use of such data, it is possible to provide various services such as control, warning, monitoring, visualization, automation, and optimization.

The technology according to the present disclosure can also be applied to devices and services related to homes. The IoT device 9001 at home includes a washing machine, a garment dryer, a dryer, a microwave, a dishwasher, a refrigerator, an oven, a rice cooker, cooking utensil, gas appliance, fire alarm, thermostat, an air conditioner, a television, a recorder, an audio device, lighting equipment, a water heater, a hot water supplier, a vacuum cleaner, a fan, an air purifier, a security camera, locking equipment, a door/shutter opening/closing device, a sprinkler, bathroom equipment, a thermometer, a scale, a blood pressure monitor, and the like. The IoT device 9001 may further include a solar cell, a fuel cell, a storage battery, a gas meter, a power meter, and a distribution board.

The communication method of the IoT device 9001 at home is preferably a low power consumption type communication method. Furthermore, the IoT device 9001 may use WiFi indoors and 3G/LTE outdoors for communication. It is allowable to install an external server 9006 for IoT device control on the cloud 9005 to control the IoT device 9001. The IoT device 9001 transmits data such as status of household devices, temperature, humidity, power consumption, presence/absence of people/animals inside and outside the house. Data transmitted from the household device is stored in the external server 9006 through the cloud 9005. A new service is provided on the basis of such data. Such an IoT device 9001 can be controlled by voice by using voice recognition technologies.

Moreover, the state of various household devices can be visualized by directly transmitting information from various household devices to the television. Furthermore, various sensors determine the presence or absence of a resident and transmit the data to an air conditioner, lighting devices, or the like so that their power can be turned on/off. Furthermore, advertisements can be displayed through the Internet on the display provided for various household devices.

An example of the IoT system 9000 to which the technique according to the present disclosure can be applied has been described above. The technology according to the present disclosure can be suitably applied to the IoT device 9001 out of the above-described configuration. The technology according to the present disclosure is applicable to the IoT device 9001, thereby making it possible to reduce the power consumption of the IoT device and extend the drive time on the battery.

Note that the above-described embodiment illustrates an example for embodying the present technology, and the matter of the embodiments corresponds to the subject matter of the invention included in the appended claims. Similarly, the subject matter of the invention included in the appended claims corresponds to the matter under the same names as the matter in the embodiments of the present technology, respectively. The present technology, however, is not limited to the embodiments, and can be embodied by making various modifications to the embodiments without departing from the scope of the technology.

Furthermore, the processing procedure in the above-described embodiments may be regarded as a method including these series of procedures, and as a program for causing a computer to execute these series of procedures or as a recording medium storing the program. This recording medium can be a compact disc (CD), a mini disc (MD), a digital versatile disc (DVD), a memory card, a Blu-ray (registered trademark) disc, or the like, for example.

Note that effects described here in the present description are provided for purposes of exemplary illustration and are not intended to be limiting. Still other effects may also be contemplated.

Note that the present technology may also be configured as below.

(1) An imaging apparatus including:

a remaining battery level detection unit that detects a remaining battery level of a battery;

a solid-state imaging element that captures image data; and a control unit that controls the solid-state imaging element so that the lower the remaining battery level, the smaller the data amount of the image data to be captured in synchronization with a predetermined synchronization signal.

(2) The imaging apparatus according to (1), in which the control unit controls imaging so that the lower the remaining battery level, the lower the resolution of the image data to be captured.

(3) The imaging apparatus according to (2), in which the solid-state imaging element includes:

a pixel array unit including a plurality of pixels arranged in a two-dimensional lattice shape; and a driver that sequentially selects and drives a plurality of lines including a predetermined number of pixels each arranged in a predetermined direction in the pixel array unit, and the control unit controls the driver so that the lower the remaining battery level, the smaller the number of lines to be selected.

(4) The imaging apparatus according to (2) or (3), in which the solid-state imaging element includes:

a pixel array unit having a plurality of pixels arranged in a two-dimensional lattice shape;

an analog-to-digital conversion unit that converts an analog signal output from the pixel array unit into a digital signal for each of pixels and outputs the signal as pixel data; and a pixel addition unit that adds the pixel data of a predetermined number, and the control unit controls the pixel addition unit so that the lower the remaining battery level, the larger the units of addition to be used to add the pixel data.

(5) The imaging apparatus according to any of (1) to (4), in which the solid-state imaging element includes:

a pixel array unit having a plurality of pixels arranged in a two-dimensional lattice shape; and an analog-to-digital conversion unit that converts an analog signal output from the pixel array unit into a digital signal for each of pixels and outputs the signal as pixel data, and the control unit controls the analog-to-digital conversion unit so that the lower the remaining battery level, the lower the bit depth of the pixel data to be output.

(6) The imaging apparatus according to any of (1) to (5), in which the control unit controls imaging so that the lower the remaining battery level, the lower the frequency of the predetermined synchronization signal to be used to capture the image data in synchronization with the synchronization signal.

(7) The imaging apparatus according to any of (1) to (6), in which the control unit controls the data amount on the basis of a comparison result obtained by comparing a predetermined threshold with the remaining battery level.

(8) The imaging apparatus according to any of (1) to (7), in which the solid-state imaging element includes:
a pixel array unit in which a plurality of pixels is arranged; and
a drive voltage supply unit that supplies a drive voltage to the pixel array unit, and
the control unit controls the drive voltage supply unit so that the lower the remaining battery level, the lower the drive voltage to be supplied.

(9) The imaging apparatus according to (8), in which the control unit supplies the drive voltage having a logarithmic value of the remaining battery level.

(10) The imaging apparatus according to any of (1) to (9), further including an image processing unit that executes a plurality of types of image processing on the image data, in which the control unit controls the image processing unit so that the lower the remaining battery level, the smaller the processing volume of the image processing to be executed.

(11) The imaging apparatus according to any of (1) to (10),
in which the image processing unit includes:
a separation unit that separates the image data into a luminance signal and a color difference signal;
a luminance signal processing unit that processes the luminance signal; and
a color signal processing unit that processes the color difference signal, and
the control unit stops either the luminance signal processing unit or the color signal processing unit in a case where the remaining battery level is lower than a predetermined threshold.

(12) The imaging apparatus according to any of (1) to (11), further including a compression unit that compresses the image data,
in which the control unit controls the compression unit so that the lower the remaining battery level, the higher the compression rate to be used to compress the image data.

(13) The imaging apparatus according to any of (1) to (12), further including a region-of-interest setting unit that sets a specific region in the image data as a region-of-interest,
in which the compression unit sets a compression rate of the predetermined region-of-interest to be lower than in a region not corresponding to the predetermined region-of-interest, and
the control unit controls the region-of-interest setting unit so that the lower the remaining battery level, the smaller the area of the predetermined region-of-interest to be set.

(14) An imaging apparatus control method including:
a remaining battery level detection step of detecting a remaining battery level;
an imaging step of capturing image data by a solid-state imaging element: and
a control step of controlling the solid-state imaging element so that the lower the remaining battery level, the smaller the data amount of the image data to be captured in synchronization with a predetermined synchronization signal.

REFERENCE SIGNS LIST

100 Server
200 Imaging apparatus
210 Battery
220 Remaining battery level detection unit
230 Communication unit
240 Control unit
241 Solid-state imaging element control unit
242 Image processing control unit
243 Encoding control unit
250 Image processing unit
251 Pixel characteristic correction processing unit
252 Synchronization processing unit
253 YC separation unit
254 Luminance signal processing unit
255 Color signal processing unit
260 Encoding unit
261 Region-of-interest setting unit
262 Compression unit
300 Solid-state imaging element
310 Drive voltage control unit
320 Vertical driver
330 Pixel array unit
340 Pixel
341 Photodiode
342 Readout transistor
343 Reset transistor
344 Drive transistor
345 Floating diffusion layer
346 Selection transistor
350 Timing control unit
360 Column signal processing unit
361 Column ADC
362 Pixel addition unit
370 PLL

The invention claimed is:

1. An imaging apparatus comprising: a remaining battery level detection circuitry that detects a remaining battery level of a battery;
a solid-state imaging element that captures image data, the solid-state imaging element including:
a pixel array circuitry in which a plurality of pixels are arranged in a two-dimensional lattice shape;
an analog-to-digital conversation circuitry that converts an analog signal output from the pixel array circuitry into a digital signal for each of the plurality of pixels and outputs the signal as pixel data,
and a pixel addition circuitry that adds the pixel data of a predetermined number; and a control circuitry that controls the solid-state imaging element so that as remaining battery level decreases, a data amount of the image data to be captured in synchronization with a predetermined synchronization signal decreases, wherein the solid-state imaging element includes a driver that sequentially selects and drives a plurality of vertical columns or horizontal rows including a predetermined number of pixels each arranged in a vertical or horizontal direction in the pixel array circuitry, in a case where the remaining battery level is lower than a predetermined threshold, the control circuitry reduces a readout image size by performing vertical or horizontal thinning by reducing a number of vertical columns or horizontal rows to be selected, and controls the pixel addition circuitry so that as the remaining battery level decreases, the number of units of addition to be used to add the pixel data increase.

2. The imaging apparatus according to claim 1, wherein the control circuitry controls imaging so that as the remaining battery level decreases, a resolution of the image data to be captured decreases.

3. The imaging apparatus according to claim 1, wherein
the plurality of pixels in the pixel array circuitry are arranged in a two-dimensional lattice shape,
the solid-state imaging element includes: an analog-to-digital conversion circuitry that converts an analog signal output from the pixel array circuitry into a digital signal for each of pixels and outputs the signal as pixel data, and
the control circuitry controls the analog-to-digital conversion circuitry so that as the remaining battery level decreases, a bit depth of the pixel data to be output decreases.

4. The imaging apparatus according to claim 1, wherein the control circuitry controls imaging so that a frequency of the predetermined synchronization signal to be used to capture the image data in synchronization with the predetermined synchronization signal decreases as the remaining battery level decreases.

5. The imaging apparatus according to claim 1, wherein the control circuitry controls the data amount on a basis of a comparison result obtained by comparing a predetermined threshold with the remaining battery level.

6. The imaging apparatus according to claim 1, wherein the solid-state imaging element includes:
a pixel array circuitry in which a plurality of pixels is arranged; and
a drive voltage supply circuitry that supplies a drive voltage to the pixel array unit, and
the control circuitry controls the drive voltage supply circuitry so that as the remaining battery level decreases, the drive voltage to be supplied decreases.

7. The imaging apparatus according to claim 1, further comprising an image processing circuitry that executes a plurality of types of image processing on the image data, wherein the control circuitry controls the image processing circuitry so that the lower the remaining battery level, the smaller a processing volume of the image processing to be executed.

8. An imaging apparatus comprising:
a remaining battery level detection circuitry that detects a remaining battery level of a battery;
a solid-state imaging element that captures image data;
a separation circuitry that separates the image data into a luminance signal and a color difference signal;
a luminance signal processing circuitry that processes the luminance signal;
a color signal processing circuitry that processes the color difference signal, and a control circuitry that:
controls the solid-state imaging element so that as a remaining battery level decreases, a data amount of the image data to be captured in synchronization with a predetermined synchronization signal decreases, and
stops either the luminance signal processing circuitry or the color signal processing circuitry in a case where the remaining battery level is lower than a predetermined threshold.

9. The imaging apparatus according to claim 1, further comprising a compression circuitry that compresses the image data, wherein the control circuitry controls the compression circuitry so that the lower the remaining battery level, the higher a compression rate to be used to compress the image data.

10. The imaging apparatus according to claim 1, wherein the control circuitry performs demosaic processing that includes interpolating missing color information from surroundings in each of the pixels.

11. The imaging apparatus according to claim 1, wherein, in a case where the remaining battery level is lower than the predetermined threshold, the control circuitry reduces the readout image size by performing vertical or horizontal thinning by reducing the number of vertical columns or horizontal rows to be selected such that as the remaining battery level decreases, the number of vertical columns or horizontal lines to be thinned out increases.

12. An imaging apparatus comprising: a remaining battery level detection circuitry that detects a remaining battery level of a battery; a solid-state imaging element that captures image data; and a control circuitry, wherein the solid-state imaging element includes: a pixel array circuitry in which a plurality of pixels is arranged, and a drive voltage supply circuitry that supplies a drive voltage to the pixel array circuitry, and the control circuitry: controls the solid-state imaging element so that as a remaining battery level decreases, a data amount of the image data to be captured in synchronization with a predetermined synchronization signal decreases, and supplies the drive voltage having a logarithmic value of the remaining battery level.

13. An imaging apparatus comprising:
a remaining battery level detection circuitry that detects a remaining battery level of a battery;
a solid-state imaging element that captures image data;
a region-of-interest setting circuitry that sets a specific region in the image data as a region-of-interest;
a compression circuitry that compresses the image data and that sets a compression rate of the predetermined region-of-interest to be lower than in a region not corresponding to the predetermined region-of-interest; and
a control circuitry that:
controls the solid-state imaging element so that as a remaining battery level decreases, a data amount of the image data to be captured in synchronization with a predetermined synchronization signal decreases, and
controls the region-of-interest setting circuitry so that as the remaining battery level decreases-an area of the predetermined region-of-interest to be set decreases.

14. An imaging apparatus comprising:
a remaining battery level detection circuitry that detects a remaining battery level of a battery;
a solid-state imaging element that captures image data, the solid-state imaging element including a pixel array circuitry in which a plurality of pixels are arranged in a two-dimensional array; and
a control circuitry that controls the solid-state imaging element so that as a remaining battery level decreases, a data amount of the image data to be captured in synchronization with a predetermined synchronization signal decreases, wherein the solid-state imaging element includes a dryer that sequentially selects and drives a plurality of vertical columns or horizontal rows including a predetermined number of pixels each arranged in a vertical or horizontal direction in the pixel array circuitry, and in a case where the remaining battery level is lower than a predetermined threshold, the control circuitry reduces a readout image size by performing vertical or horizontal thinning by reducing a number of vertical columns or horizontal rows to be selected, and wherein the solid-state imaging element includes an analogto-digital conversion circuitry that converts an analog signal output from the pixel array circuitry into a digital signal for each of pixels and outputs the signal as pixel data, and the control circuitry controls the solid-state imaging element so that, in a case where the remaining battery level is lower than a predetermined threshold, the analog-to-digital conversion circuitry reduces a pixel bit depth by truncating a least significant bit.

* * * * *